United States Patent
Togashi

(10) Patent No.: US 9,214,283 B2
(45) Date of Patent: Dec. 15, 2015

(54) MULTILAYER CAPACITOR AND METHOD OF MANUFACTURING SAME

(75) Inventor: Masaaki Togashi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 194 days.

(21) Appl. No.: 13/488,999

(22) Filed: Jun. 5, 2012

(65) Prior Publication Data

US 2012/0314338 A1  Dec. 13, 2012

(30) Foreign Application Priority Data

Jun. 13, 2011  (JP) .................. 2011-131163

(51) Int. Cl.
| | |
|---|---|
| *H01G 4/228* | (2006.01) |
| *H01G 4/06* | (2006.01) |
| *H01G 4/30* | (2006.01) |
| *H01G 4/012* | (2006.01) |
| *H01G 4/232* | (2006.01) |

(52) U.S. Cl.
CPC .................. *H01G 4/30* (2013.01); *H01G 4/012* (2013.01); *H01G 4/232* (2013.01); *Y10T 29/417* (2015.01)

(58) Field of Classification Search
CPC ......... H01G 4/30; H01G 4/228; H01G 4/232; H01G 4/1227
USPC ............. 361/321.2, 306.3, 307, 308.1, 321.1, 361/306.1
See application file for complete search history.

(56) References Cited

U.S. PATENT DOCUMENTS

| | | | |
|---|---|---|---|
| 6,069,786 A * | 5/2000 | Horie et al. ................... | 361/303 |
| 7,397,118 B2 * | 7/2008 | Tominaga ............... | H01G 4/30 |
| | | | 257/700 |
| 7,667,950 B2 | 2/2010 | Togashi | |
| 2008/0310076 A1* | 12/2008 | Ritter et al. .................. | 361/302 |
| 2009/0154055 A1* | 6/2009 | Takashima et al. ........ | 361/301.4 |

FOREIGN PATENT DOCUMENTS

| | | |
|---|---|---|
| JP | 2002033236 A * | 1/2002 |
| JP | A-2008-71811 | 3/2008 |

* cited by examiner

*Primary Examiner* — Eric Thomas
*Assistant Examiner* — Arun Ramaswamy
(74) *Attorney, Agent, or Firm* — Oliff PLC

(57) ABSTRACT

In a multilayer capacitor 1, burned layers 17A, 17B are formed so as to cover all of lead conductors 12A, 12B drawn from inner electrodes 6A, 6B to end faces of a multilayer body 2. This can keep a plating solution from infiltrating onto the inner electrodes 6A, 6B when forming plating layers 18A, 18B and prevent insulation failures from occurring. Since the burned layers 17A, 17B cover a part of dummy electrodes 13C, 13F, 13G, 13H, the area of the burned layers 17A, 17B can be suppressed. This can inhibit excessive stresses from occurring in the burned layers 17A, 17B and thus can prevent cracks from being generated by stresses in the burned layers 17A, 17B.

20 Claims, 20 Drawing Sheets (a)

(b)

(c)

(a)

(b)

(c)

(a)

(b)

(c)

(a)

(b)

(c)

(a)

(b)

(c)

(a)

(b)

(c)

MULTILAYER CAPACITOR AND METHOD OF MANUFACTURING SAME

BACKGROUND OF THE INVENTION

1. Field of the Invention

The present invention relates to a method of manufacturing a multilayer capacitor.

2. Related Background Art

Known as an example of conventional multilayer capacitors is one disclosed in Patent Literature 1. This multilayer capacitor is equipped with a multilayer body in which first and second inner electrodes are stacked alternately with dielectric layers interposed therebetween. First and second terminal electrodes are disposed at both end faces of the multilayer body, respectively, the first inner electrodes are connected to the first terminal electrode through first lead parts, and the second inner electrodes are connected to the second terminal electrode through second lead parts. The positions of the first lead parts vary among the first inner electrodes. This causes capacitor units to have respective equivalent series inductances different from each other, so as to yield a plurality of resonance frequencies, thereby achieving a multilayer capacitor exhibiting low impedance over a wide band.

Patent Literature 1: Japanese Patent Application Laid-Open No. 2008-071811

SUMMARY OF THE INVENTION

Technical Problem

In a multilayer capacitor such as the one mentioned above, green sheets formed with predetermined inner electrode patterns are stacked and fired, so as to yield a multilayer body, end parts of which are then dipped into a conductive paste, which is burned thereafter, so as to form terminal electrodes. When forming the terminal electrodes by dipping, however, the paste layer tends to attach to the multilayer body by a larger area with a greater thickness in general, whereby a stress may occur in the burned layer. When the stress is in excess, it may be problematic in that cracks are likely to occur in the multilayer body. While there is a case where a plating layer is further formed on the burned layer, simply reducing the thickness and area of the burned layer may allow a plating solution to infiltrate onto the inner electrodes, thereby causing an insulation failure.

For solving the problem mentioned above, it is an object of the present invention to provide a multilayer capacitor and a method of manufacturing the same which can prevent cracks from being generated by stresses in the burned layer and insulation failures from being caused by the infiltration with the plating solution.

Solution to Problem

For achieving the above-mentioned object, the multilayer capacitor in accordance with the present invention comprises a multilayer body constructed by stacking a plurality of dielectric layers formed with an inner electrode, a terminal electrode formed on a surface of the multilayer body, a lead conductor drawn from the inner electrode to the surface of the multilayer body and connected to the terminal electrode, and a dummy electrode separated from the inner electrode and connected to the terminal electrode; wherein the terminal electrode has a burned layer and a plating layer each formed on the surface of the multilayer body; wherein the burned layer covers the whole of the lead conductor and a part of the dummy electrode; and wherein the plating layer covers the rest of the dummy electrode and the burned layer.

In this multilayer capacitor, the burned layer is formed so as to cover the whole of the lead conductor drawn from the inner electrode to the surface of the multilayer body. This can keep the plating solution from infiltrating onto the inner electrode when forming the plating layer and prevent insulation failures from occurring. The burned layer can reduce its area, since it covers a part of the dummy electrode. This can inhibit excessive stresses from occurring in the burned layer and thus can prevent cracks from being generated by stresses in the burned layer. Since the burned layer covers a part of the dummy layer, a plating layer can be formed on the dummy electrode not only reliably but also by a uniform thickness with the plating layer on the burned layer.

Preferably, one side of the multilayer body is a mount surface to a substrate, while the inner electrode is lopsided to the side opposite from the mount surface in the multilayer body. This can fully secure a distance between the mount surface and the inner electrode, whereby cracks can be inhibited from reaching the inner electrode even if a microcrack is generated by an electrostrictive stress. This can restrain capacitance from fluctuating.

Preferably, the inner electrode is arranged substantially orthogonal to the mount surface. This can achieve lower ESL even when a greater number of inner electrodes are arranged.

Preferably, dummy electrodes are disposed on both sides of the lead conductor interposed therebetween, while the burned layer is disposed so as to connect the dummy electrodes to each other. This keeps the width of the lead conductor relatively narrow, so that the burned layer can be made smaller, whereby the stress of the burned layer can further be suppressed. On the other hand, connecting the dummy electrodes together by the burned layer can secure the width of the terminal electrode, which makes it easier for them to be mounted on the substrate. It also reduces the distance between terminal electrodes, so as to achieve lower ESL.

Preferably, the dummy electrode is disposed on the same layer with the inner electrode corresponding thereto. This can secure a greater width in the terminal electrode. It also decreases the distance between the dummy electrodes and the distance between the dummy electrode and lead conductor, so that the plating layer can reliably be formed by connecting these electrodes to each other with plating.

Preferably, the dummy electrode is exposed at a region of the multilayer body excluding a corner thereof. This can prevent dielectric layers from peeling off from each other.

The method of manufacturing a multilayer capacitor in accordance with the present invention is a method of manufacturing a multilayer capacitor comprising a multilayer body constructed by stacking a plurality of dielectric layers formed with an inner electrode, a terminal electrode formed on a surface of the multilayer body, a lead conductor drawn from the inner electrode to the surface of the multilayer body and connected to the terminal electrode, and a dummy electrode separated from the inner electrode and connected to the terminal electrode, the method comprising the steps of forming a burned layer by burning a conductive paste applied so as to cover the whole of the lead conductor and a part of the dummy electrode and forming a plating layer on the surface of the multilayer body so as to cover the rest of the dummy electrode and the burned layer.

This method of manufacturing a multilayer capacitor forms the burned layer so as to make it cover the whole of the lead conductor drawn from the inner electrode to the surface of the multilayer body. This can keep the plating solution from infiltrating onto the inner electrode when forming the plating layer and prevent insulation failures from occurring. The burned layer can reduce its area, since it is formed so as to cover a part of the dummy electrode. This can inhibit excessive stresses from occurring in the burned layer and thus can prevent cracks from being generated by stresses in the burned layer. Since the burned layer covers a part of the dummy layer, a plating layer can be formed on the dummy electrode not only reliably but also by a uniform thickness with the plating layer on the burned layer.

Advantageous Effects of Invention

The present invention can prevent cracks from being generated by stresses in the burned layer and insulation failures from being caused by the infiltration with the plating solution.

DESCRIPTION OF THE PREFERRED EMBODIMENTS

In the following, preferred embodiments of the multilayer capacitor and method of manufacturing the same in accordance with the present invention will be explained in detail with reference to the drawings.

First Embodiment

Figure 1:
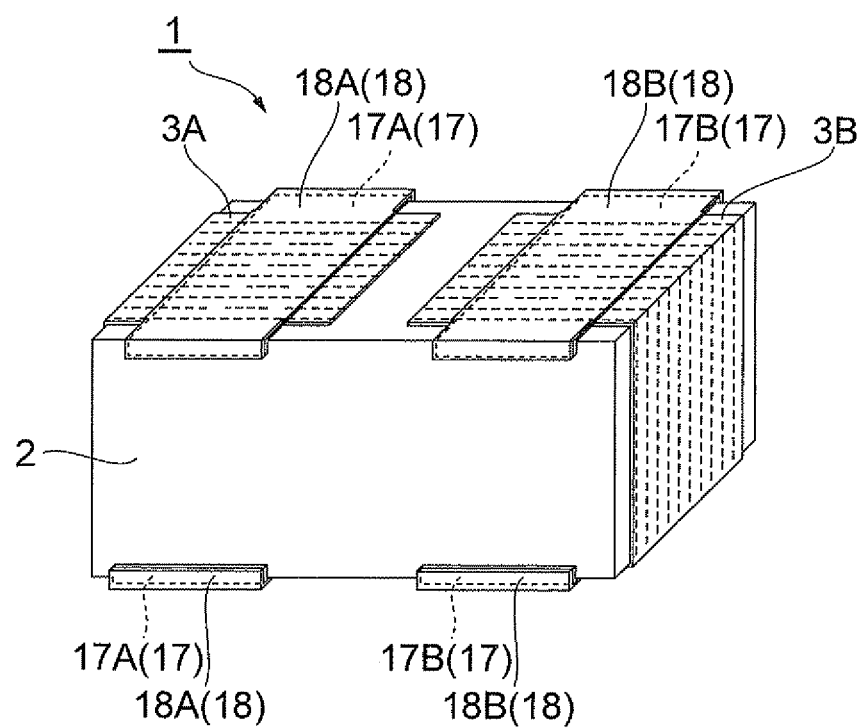
FIG. 1 is a perspective view illustrating the multilayer capacitor in accordance with a first embodiment of the present invention.
Figure 2:
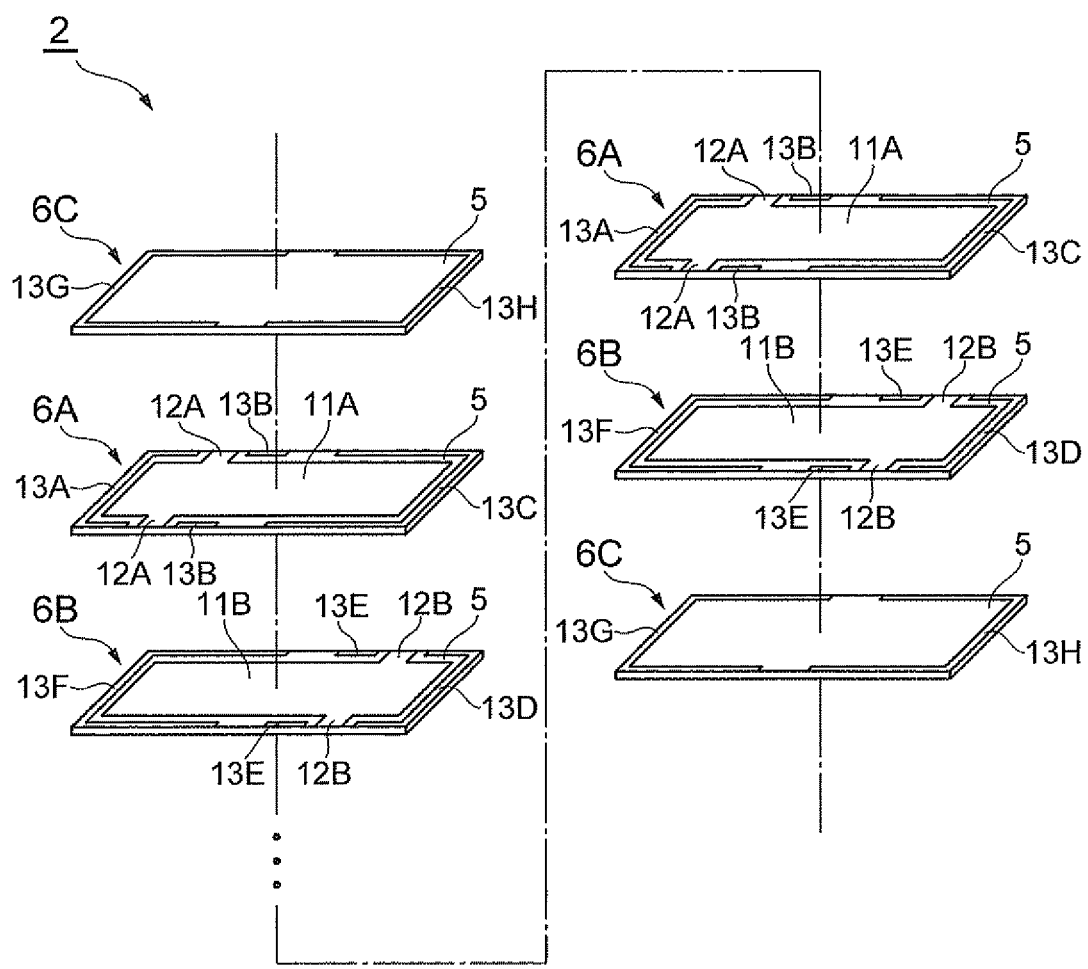
FIG. 2 is a diagram illustrating a layer structure of the multilayer capacitor shown in FIG. 1.

FIG. 1 is a perspective view illustrating the multilayer capacitor in accordance with the first embodiment of the present invention. FIG. 2 is a diagram illustrating a layer structure of the multilayer capacitor shown in FIG. 1. As illustrated in these drawings, this multilayer capacitor 1 comprises a multilayer body 2 having a substantially rectangular parallelepiped form and first and second outer electrodes 3A, 3B formed on end faces of the multilayer body 2.

Within the multilayer body 2, as illustrated in FIG. 2, a plurality of inner electrodes 6 having different electrode patterns are stacked alternately with dielectric layers 5. Each dielectric layer 5 is made of a ceramic green sheet containing a dielectric ceramic, while each inner electrode 6 is constituted by a sintered body of a conductive paste. In practice, the multilayer capacitor 1 is integrated to such an extent that boundaries between the dielectric layers 5, 5 are indiscernible. The stacking direction of the inner electrodes 6 illustrated in FIG. 2 coincides with the depth direction of the multilayer body 2 in FIG. 1, while an end face (bottom face here) orthogonal to the stacking direction of the inner electrodes 6 in the multilayer body 2 serves as a mount surface when mounted to a substrate.

Figure 3:
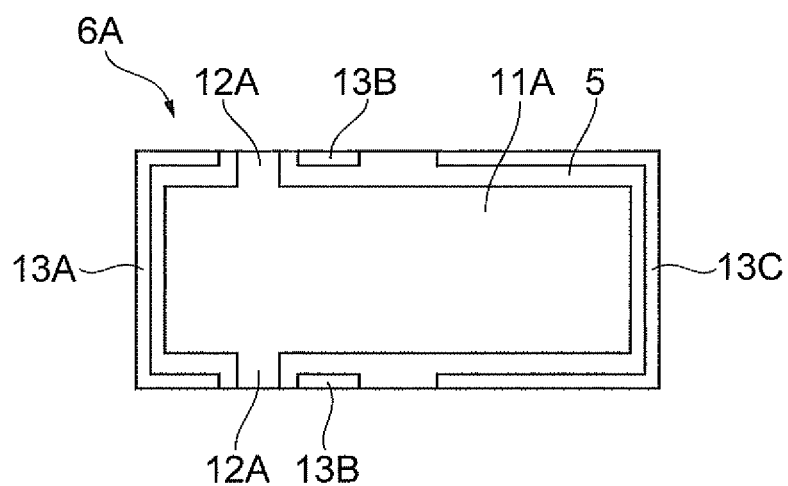
FIG. 3 is a set of diagrams illustrating inner electrode patterns of the multilayer capacitor shown in FIG. 1.
Figure 3:
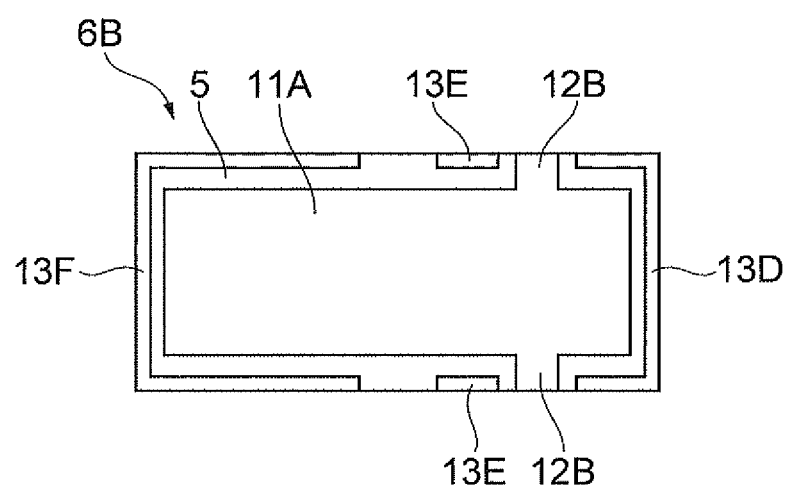
Figure 3:
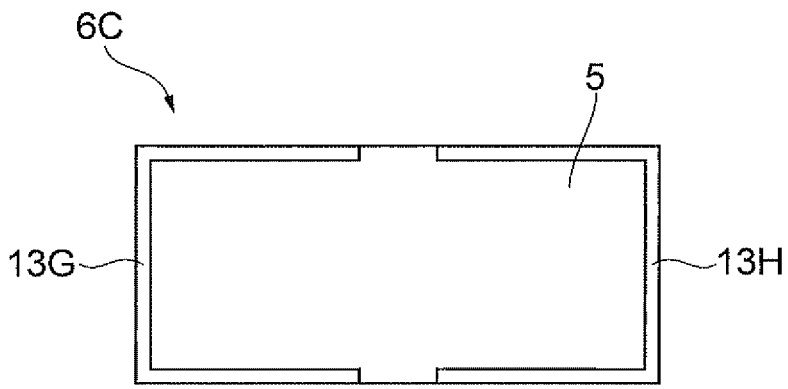

More specifically, as illustrated in FIG. 3, the inner electrodes 6 have two kinds of inner electrodes 6A, 6B with respective patterns different from each other. As illustrated in FIG. 3(*a*), the inner electrode 6A has a rectangular main electrode part 11A formed at a center portion and lead conductors 12A respectively drawn in the height direction of the multilayer body 2 from positions near the first terminal electrode 3A in the main electrode part 11A. The lead conductors 12A have respective end parts exposed at both end faces in the height direction of the multilayer body 2 and connected to the first terminal electrode 3A.

Dummy electrodes 13A, 13B, 13C are formed on the same layer with the inner electrode 6A. The dummy electrode 13A has a U-shaped cross section extending over one longitudinal end face of the multilayer body 2 and edges of both end faces in the height direction adjacent thereto, so as to connect with the first terminal electrode 3A. The dummy electrodes 13B extend on the opposite side of the lead conductors 12A from the dummy electrode 13A at both end faces in the height direction of the multilayer body 2, so as to connect with the first terminal electrode 3A. The dummy electrode 13C has a U-shaped cross section extending over the other longitudinal end face of the multilayer body 2 and edges of both end faces in the height direction adjacent thereto, so as to connect with the second terminal electrode 3B.

As illustrated in FIG. 3(*b*), the inner electrode 6B has a rectangular main electrode part 11B formed at a center portion and lead conductors 12B respectively drawn in the height direction of the multilayer body 2 from positions near the second terminal electrode 3B in the main electrode part 11B. The lead conductors 12B have respective end parts exposed at both end faces in the height direction of the multilayer body 2 and connected to the second terminal electrode 3B.

Dummy electrodes 13D, 13E, 13F are formed on the same layer with the inner electrode 6B. The dummy electrode 13D has a U-shaped cross section extending over the other longitudinal end face of the multilayer body 2 and edges of both end faces in the height direction adjacent thereto, so as to connect with the second terminal electrode 3B. The dummy electrodes 13E extend on the opposite side of the lead conductors 12B from the dummy electrode 13B at both end faces in the height direction of the multilayer body 2, so as to connect with the second, terminal electrode 3B. The dummy electrode 13F has a U-shaped cross section extending over one longitudinal end face of the multilayer body 2 and edges of both end faces in the height direction adjacent thereto, so as to connect with the first terminal electrode 3A.

In thus constructed multilayer body 2, the main electrode parts 11A, 11B of the inner electrodes 6A, 6B overlap each other when seen in the stacking direction, so as to form a capacity-forming region. In this embodiment, the whole surface of the main electrode part 11A overlaps substantially the whole surface of the main electrode part 11B, thereby fully securing a capacity-forming region.

A protective layer 6C can be laid as appropriate on a surface layer part in the stacking direction of the multilayer body 2. As illustrated in FIG. 3(c), the protective layer 6C is formed with dummy electrodes 13G, 13H. The dummy electrode 13G has a U-shaped cross section extending over one longitudinal end face of the multilayer body 2 and edges of both end faces in the height direction adjacent thereto, so as to connect with the first terminal electrode 3A. The dummy electrode 13H has a U-shaped cross section extending over the other longitudinal end face of the multilayer body 2 and edges of both end faces in the height direction adjacent thereto, so as to connect with the second terminal electrode 3B.

The first and second terminal electrodes 3A, 3B are electrodes to connect with predetermined polarities when mounting the multilayer capacitor 1 to a mounting substrate. The first terminal electrode 3A has a U-shaped cross section extending over one longitudinal end face of the multilayer body 2 and edges of both end faces in the height direction adjacent thereto. The second terminal electrode 3B has a U-shaped cross section extending over the other longitudinal end face of the multilayer body 2 and edges of both end faces in the height direction adjacent thereto.

As illustrated in FIG. 1, each of the first and second terminal electrodes 3A, 3B is constructed by burned layers 17 formed by burning a conductive paste containing a conductive metal powder and a glass frit and a plating layer 18 constituted by a single layer of Cu, an Ni/Sn layer, or the like.

More specifically, burned layers 17A constituting the first terminal electrode 3A are formed into rectangles on both end faces in the height direction of the multilayer body 2, respectively, so as to connect the lead conductors 12A to the edges of the dummy electrodes 13A, 13B located on both sides of the lead conductors 12A and cover a part of the dummy electrodes 13F, 13G. A plating layer 18A is formed into a U-shaped cross section extending over one longitudinal end face of the multilayer body 2 and edges of both end faces in the height direction adjacent thereto so as to cover the rest of the dummy electrodes 13A, 13B, 13F, 13G not covered with the burned layers 17A and the burned layers 17A.

Burned layers 17B constituting the second terminal electrode 3B are formed into rectangles on both end faces in the height direction of the multilayer body 2, respectively, so as to connect the lead conductors 12B to the edges of the dummy electrodes 13D, 13E located on both sides of the lead conductors 12B and cover a part of the dummy electrodes 13C, 13H. A plating layer 18B is formed into a U-shaped cross section extending over the other longitudinal end face of the multilayer body 2 and edges of both end faces in the height direction adjacent thereto so as to cover the rest of the dummy electrodes 13C, 13D, 13E, 13H not covered with the burned layers 17B and the burned layers 17B.

Figure 4:
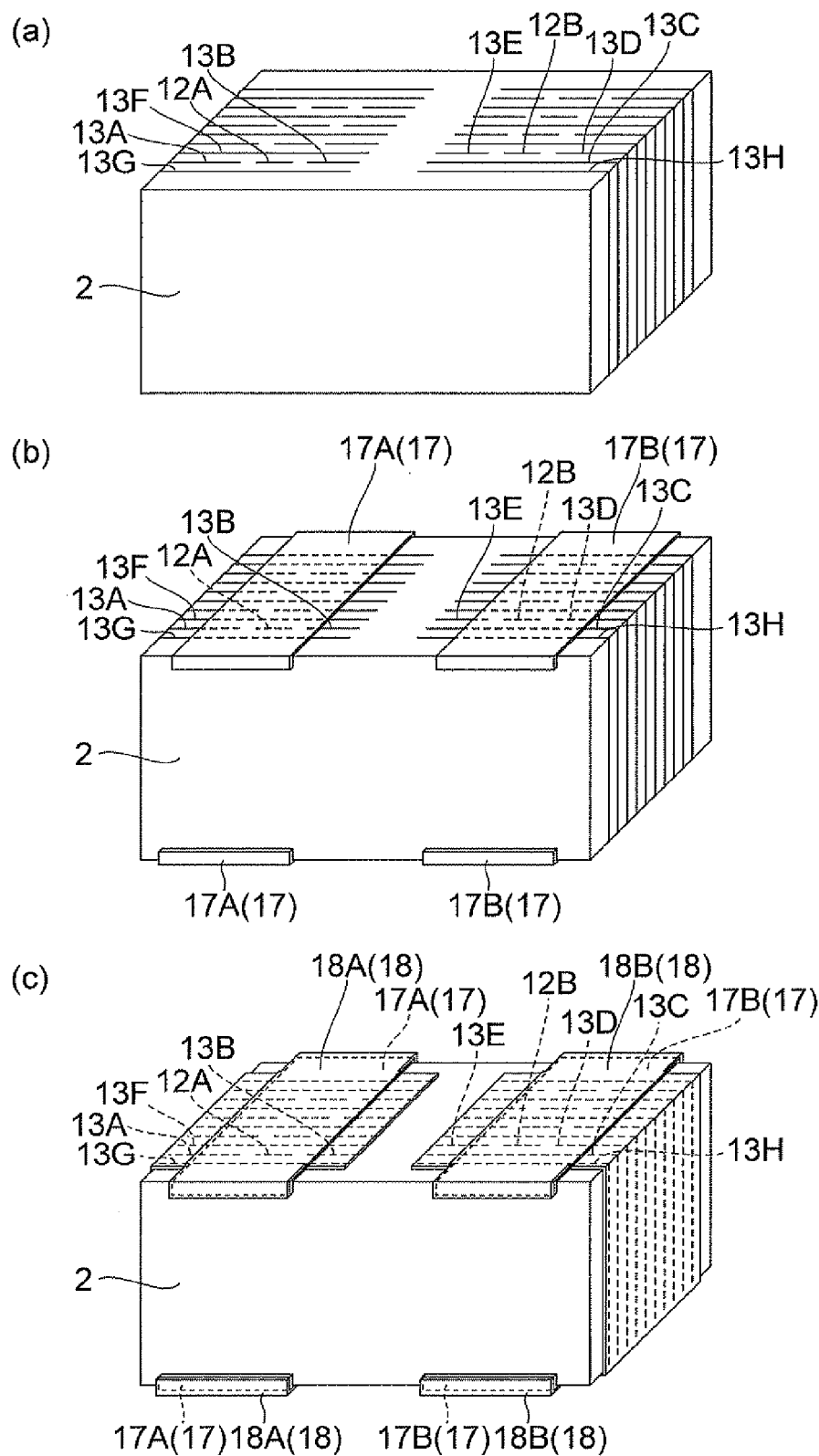
FIG. 4 is a set of diagrams illustrating a process of manufacturing terminal electrodes of the multilayer capacitor shown in FIG. 1.

FIG. 4 is a set of diagrams illustrating a process of manufacturing the terminal electrodes 3A, 3B. First, green sheets formed with the above-mentioned electrode patterns by screen printing or the like are stacked and subjected to steps of pressing, cutting, firing, and the like, so as to yield the multilayer body 2 as illustrated in FIG. 4(a).

Subsequently, as illustrated in FIG. 4(b), a conductive paste is applied to both end faces in the height direction of the multilayer body 2 by dipping, for example, so as to cover the lead conductors 12A, edges of the dummy electrodes 13A, 13B located on both sides of the lead conductors 12A, and a part of the dummy electrodes 13F, 13G. The conductive paste is also applied to both end faces in the height direction of the multilayer body 2 so as to cover the lead conductors 12B, edges of the dummy electrodes 13D, 13E located on both sides of the lead conductors 12B, and a part of the dummy electrodes 13C, 13H. Then, the conductive paste is burned at a predetermined temperature, so as to form the burned layers 17A, 17B.

Finally, as illustrated in FIG. 4(c), the plating layer 18A is formed over one longitudinal end face of the multilayer body 2 and edges of both end faces in the height direction adjacent thereto so as to cover the rest of the dummy electrodes 13A, 13B, 13F, 13G not covered with the burned layers 17A and the burned layers 17A. Also, the plating layer 18B is formed over the other longitudinal end face of the multilayer body 2 and edges of both end faces in the height direction adjacent thereto so as to cover the rest of the dummy electrodes 13C, 13D, 13E, 13H not covered with the burned layers 17B and the burned layers 17B. This forms the terminal electrodes 3A, 3B, thereby yielding the multilayer capacitor 1. For example, electroplating can be used for forming the plating layers 18A, 18B.

In thus constructed multilayer capacitor 1, the burned layers 17A, 17B are formed so as to cover all of the lead conductors 12A, 12B drawn from the inner electrodes 6A, 6B to end faces of the multilayer body 2. This can keep the plating solution from infiltrating onto the inner electrodes 6A, 6B when forming the plating layers 18A, 18B and prevent insulation failures from occurring. Since the burned layers 17A, 17B cover a part of the dummy electrodes 13C, 13F, 13G, 13H, the area of the burned layers 17A, 17B can be made smaller than in the case where all of the dummy electrodes 13C, 13F, 13G, 13H are covered. This can inhibit excessive stresses from occurring in the burned layers 17A, 17B and thus can prevent cracks from being generated by stresses in the burned layers 17A, 17B.

Since the burned layers 17A, 17B cover a part of the dummy electrodes 13C, 13F, 13G, 13H, when covering the rest of the dummy electrodes 13C, 13F, 13G, 13H with the plating layers 18A, 18B, a current is easier to flow into the plating layers 18A, 18B through conductive particles contained in the burned layers 17A, 17B, whereby the plating layers 18A, 18B can be formed reliably.

In the multilayer capacitor 1, the inner electrodes 6A, 6B are arranged substantially orthogonal to the mount surface. This can achieve lower ESL even when the number of the inner electrodes 6A, 6B increases.

Further, in the multilayer capacitor 1, the dummy electrodes 13A, 13B are disposed on both sides of the lead conductors 12A, respectively, while the burned layers 17A are provided so as to connect the dummy electrodes 13A, 13B to each other. The dummy electrodes 13D, 13E are disposed on both sides of the lead conductors 12B, respectively, while the burned layers 17B are provided so as to connect the dummy electrodes 13D, 13E to each other. This keeps the width of the lead conductors 12A, 12B relatively narrow on end faces of the multilayer body 2, so that the burned layers 17A, 17B can be made smaller, whereby the stress of the burned layers 17A, 17B can further be suppressed. On the other hand, connecting the dummy electrodes 13D, 13E together by the burned layers 17A, 17B can secure the width of the terminal electrodes 3A, 3B, which makes it easier for them to be mounted on the substrate. It also reduces the distance between terminal electrodes 3A, 3B, so as to achieve lower ESL.

In the multilayer capacitor 1, the dummy electrodes 13A to 13C, 13D to 13F are disposed on the same layers with their corresponding inner electrodes 6A, 6B. This allows the terminal electrodes 3A,3B to secure a greater width. It also decreases the distance between the dummy electrodes 13A to 13F and the distance between the dummy electrodes 13A to 13F and lead conductors 12A, 12B, so that the plating layers 18A, 18B can reliably be formed by connecting these electrodes to each other with plating. Even when the dummy electrodes 13A to 13F are provided over a plurality of layers, forming the burned layers 17A, 17B earlier can keep the plating solution from infiltrating onto the inner electrodes 6A, 6B and prevent insulation failures from occurring.

Second Embodiment

Figure 5:
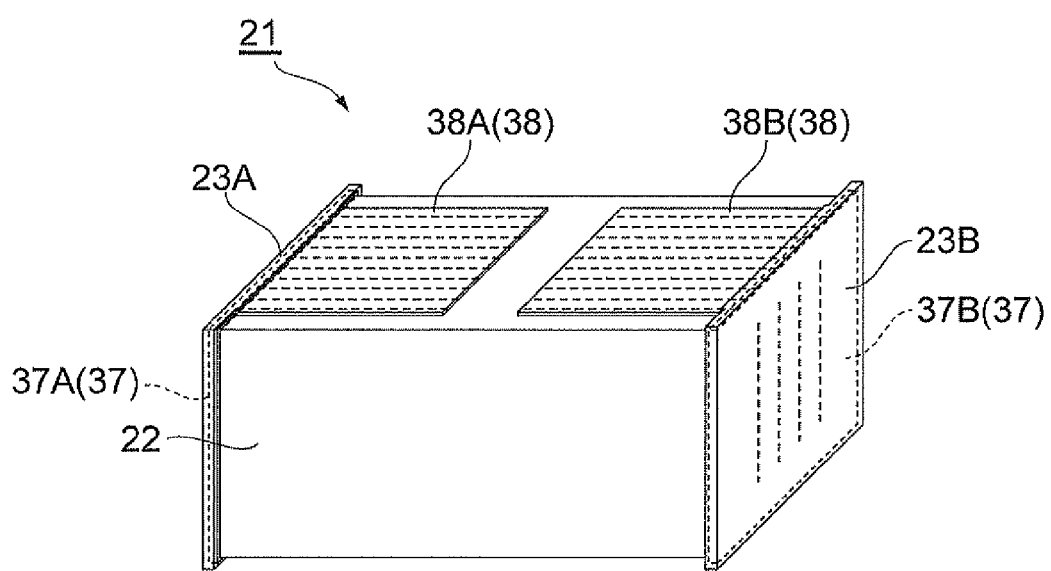
FIG. 5 is a perspective view illustrating the multilayer capacitor in accordance with a second embodiment of the present invention.
Figure 6:
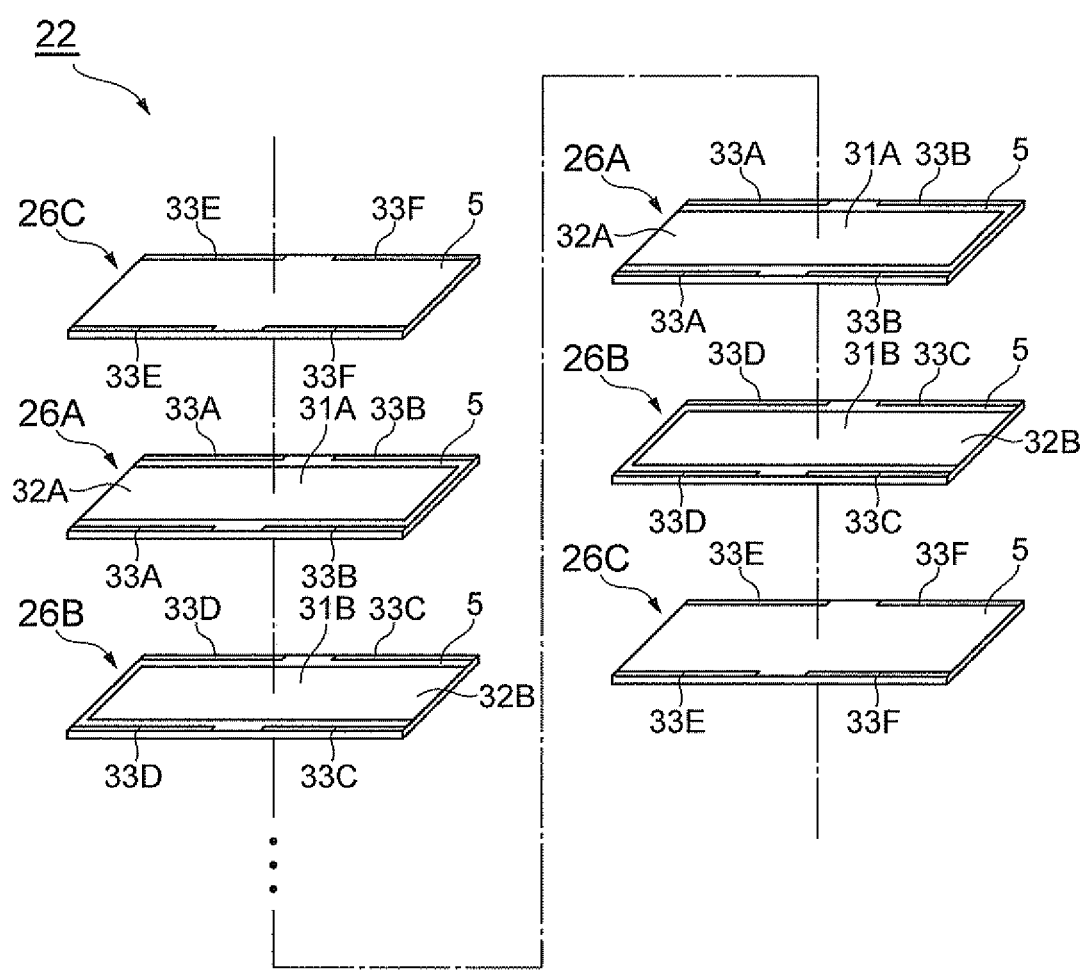
FIG. 6 is a diagram illustrating a layer structure of the multilayer capacitor shown in FIG. 5.

FIG. 5 is a perspective view illustrating the multilayer capacitor in accordance with the second embodiment of the present invention. FIG. 6 is a diagram illustrating a layer structure of the multilayer capacitor shown in FIG. 5. As illustrated in these drawings, this multilayer capacitor 21 differs from the first embodiment in electrode patterns of inner electrodes 26A, 26B and their resulting structures of terminal electrodes 23A, 23B.

Figure 7:
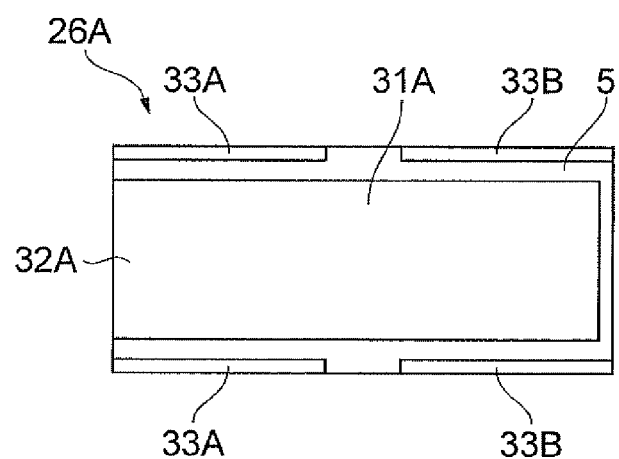
FIG. 7 is a set of diagrams illustrating inner electrode patterns of the multilayer capacitor shown in FIG. 5.
Figure 7:
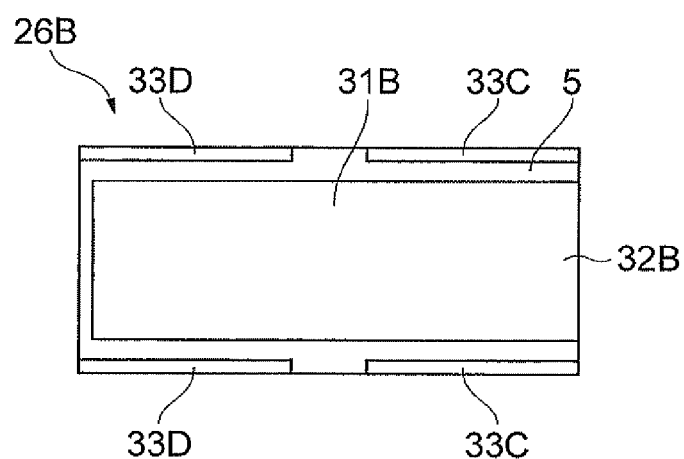
Figure 7:
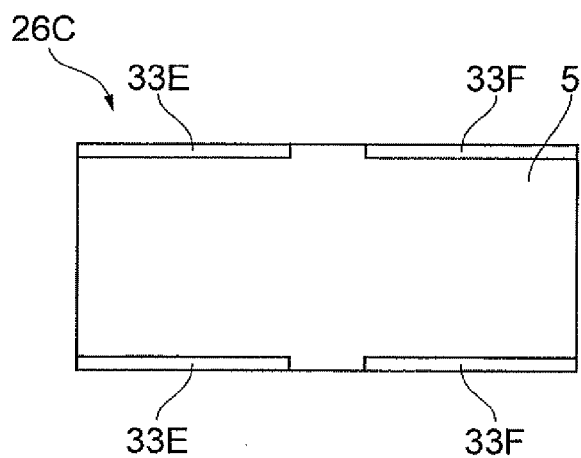

More specifically, as illustrated in FIG. 7, inner electrodes 26 have two kinds of inner electrodes 26A, 26B with respective patterns different from each other. As illustrated in FIG. 7(a), the inner electrode 26A has a rectangular main electrode part 31A formed at a center portion and a lead conductor 32A drawn from the main electrode part 31A longitudinally of a multilayer body 22. An end part of the lead conductor 32A is exposed at one longitudinal end face of the multilayer body 22 and connected to the first terminal electrode 23A.

Dummy electrodes 33A, 33B are formed on the same layer with the inner electrode 26A. The dummy electrodes 33A extend along end parts on one longitudinal end face side on both end faces in the height direction of the multilayer body 22, respectively, so as to hold the lead conductor 32A therebetween and connect with the first terminal electrode 23A. The dummy electrodes 33B extend along end parts on the other longitudinal end face side on both end faces in the height direction of the multilayer body 22, respectively, so as to connect with the second terminal electrode 23B.

As illustrated in FIG. 7(b), the inner electrode 26B has a rectangular main electrode part 31B formed at a center portion and a lead conductor 32B drawn from the main electrode part 31B longitudinally of the multilayer body 22. An end part of the lead conductor 32B is exposed at the other longitudinal end face of the multilayer body 22 and connected to the second terminal electrode 23B.

Dummy electrodes 33C, 33D are formed on the same layer with the inner electrode 26B. The dummy electrodes 33C extend along end parts on the other longitudinal end face side on both end faces in the height direction of the multilayer body 22, respectively, so as to hold the lead conductor 32B therebetween and connect with the second terminal electrode 23B. The dummy electrodes 33D extend along end parts on one longitudinal end face side on both end faces in the height direction of the multilayer body 22, respectively, so as to connect with the first terminal electrode 23A.

A protective layer 26C can be laid as appropriate on a surface layer part in the stacking direction of the multilayer body 22. As illustrated in FIG. 7(c), the protective layer 26C is formed with dummy electrodes 33E, 33F. The dummy electrodes 33E extend along end parts on one longitudinal end face side on both end faces in the height direction of the multilayer body 22, respectively, so as to connect with the first terminal electrode 23A. The dummy electrodes 33F extend along end parts on the other longitudinal end face side on both end faces in the height direction of the multilayer body 22, respectively, so as to connect with the second terminal electrode 23B.

The first terminal electrode 23A has a U-shaped cross section extending over one longitudinal end face of the multilayer body 22 and edges of both end faces in the height direction adjacent thereto. The second terminal electrode 23B has a U-shaped cross section extending over the other longitudinal end face of the multilayer body 22 and edges of both end faces in the height direction adjacent thereto.

As illustrated in FIG. 5, each of the first and second terminal electrodes 23A, 23B is constructed by a burned layer 37 formed by burning a conductive paste containing a conductive metal powder and a glass frit and a plating layer 38 constituted by a single layer of Cu, an Ni/Sn layer, or the like.

More specifically, a burned layer 37A constituting the first terminal electrode 23A is formed into a rectangle on one longitudinal end face of the multilayer body 22 so as to connect the lead conductors 32A to the edges of the dummy electrodes 33A, 33A located on both sides of the lead conductors 32A and cover edges of the dummy electrodes 33D, 33E. A plating layer 38A is formed into a U-shaped cross section extending over one longitudinal end face of the multilayer body 22 and edges of both end faces in the height direction adjacent thereto so as to cover the rest of the dummy electrodes 33A, 33D, 33E not covered with the burned layer 37A and the burned layer 37A.

A burned layer 37B constituting the second terminal electrode 23B is formed into a rectangle on the other longitudinal end face of the multilayer body 22 so as to connect the lead conductors 32B to the edges of the dummy electrodes 33C, 33C located on both sides of the lead conductors 32B and cover edges of the dummy electrodes 33B, 33F. A plating layer 38B is formed into a U-shaped cross section extending over the other longitudinal end face of the multilayer body 22 and edges of both end faces in the height direction adjacent thereto so as to cover the rest of the dummy electrodes 33B, 33C, 33F not covered with the burned layer 37B and the burned layer 37B.

Figure 8:
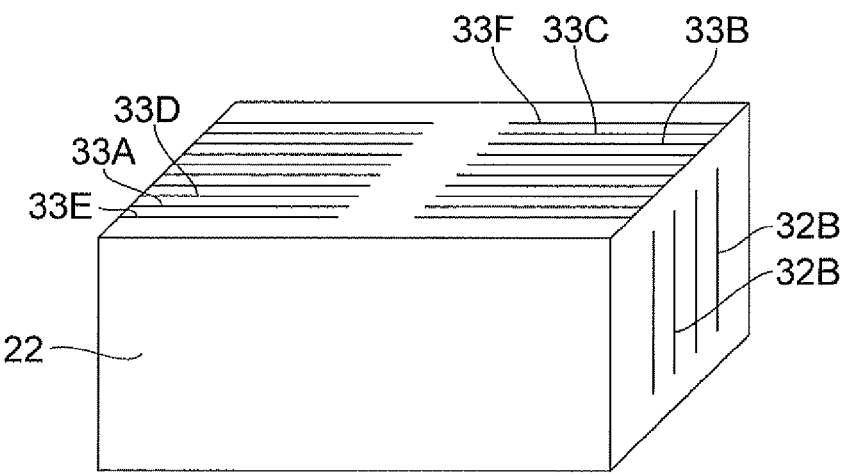
FIG. 8 is a set of diagrams illustrating a process of manufacturing terminal electrodes of the multilayer capacitor shown in FIG. 5.
Figure 8:
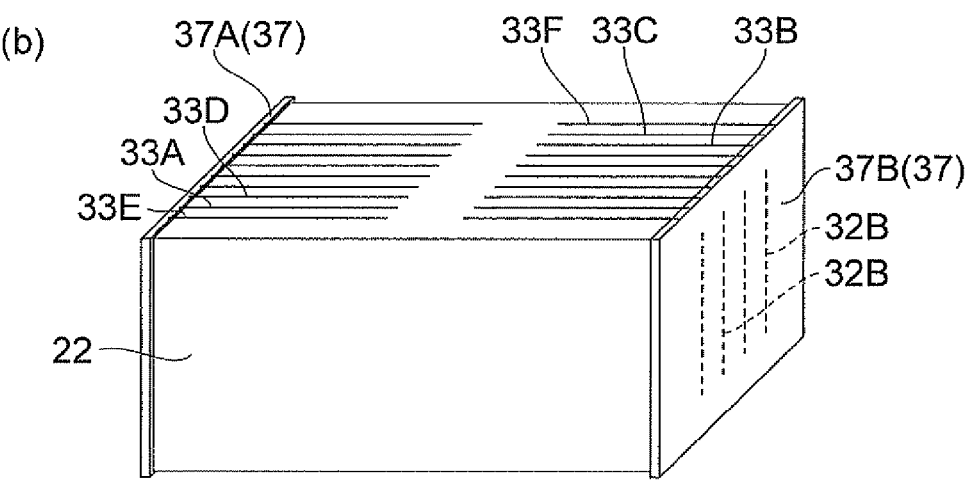
Figure 8:
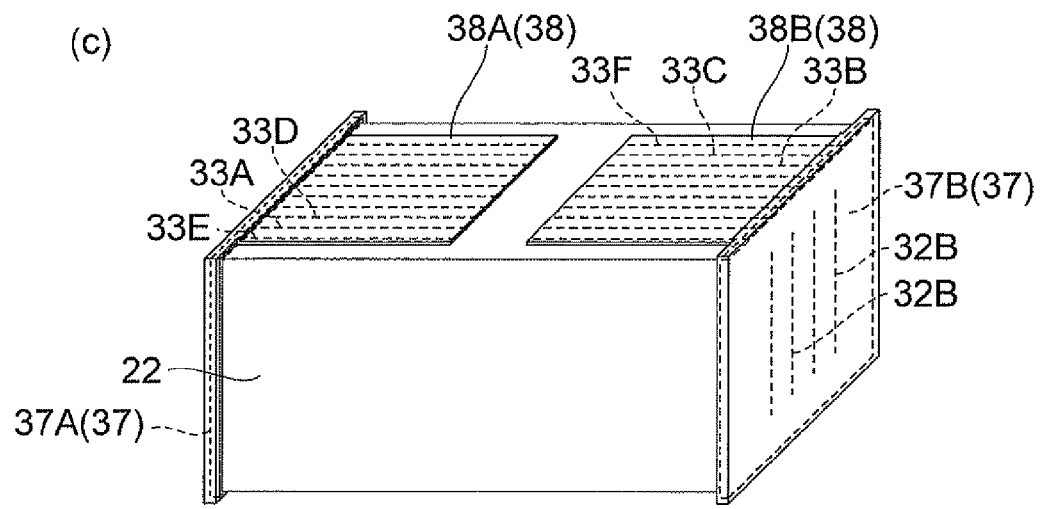

FIG. 8 is a set of diagrams illustrating a process of manufacturing the terminal electrodes 23A, 23B. First, green sheets formed with the above-mentioned electrode patterns by screen printing or the like are stacked and subjected to steps of pressing, cutting, firing, and the like, so as to yield the multilayer body 22 as illustrated in FIG. 8(a).

Subsequently, as illustrated in FIG. 8(b), a conductive paste is applied to one longitudinal end face of the multilayer capacitor 22 by dipping, for example, so as to cover the lead conductors 32A, the edges of the dummy electrodes 33A, 33A located on both sides of the lead conductors 32A, and a part of the dummy electrodes 33D, 33E. The conductive paste is also applied to the other longitudinal end face of the multilayer capacitor 22 so as to cover the lead conductors 32B, the edges of the dummy electrodes 33C, 33C located on both sides of the lead conductors 32B, and a part of the dummy electrodes 33B, 33F. Then, the conductive paste is burned at a predetermined temperature, so as to form the burned layers 37A, 37B.

Finally, as illustrated in FIG. 8(c), the plating layer 38A is formed over one longitudinal end face of the multilayer body 22 and edges of both end faces in the height direction adjacent thereto so as to cover the rest of the dummy electrodes 33A, 33D, 33E not covered with the burned layer 37A and the burned layer 37A. Also, the plating layer 38B is formed over the other longitudinal end face of the multilayer body 22 and edges of both end faces in the height direction adjacent thereto so as to cover the rest of the dummy electrodes 33B, 33C, 33F not covered with the burned layer 37B and the burned layer 37B. This forms the terminal electrodes 23A, 23B, thereby yielding the multilayer capacitor 21. For example, electroplating can be used for forming the plating layers 38A, 38B.

Thus constructed multilayer capacitor 21 can also achieve operations and effects similar to those of the first embodiment.

Third Embodiment

Figure 9:
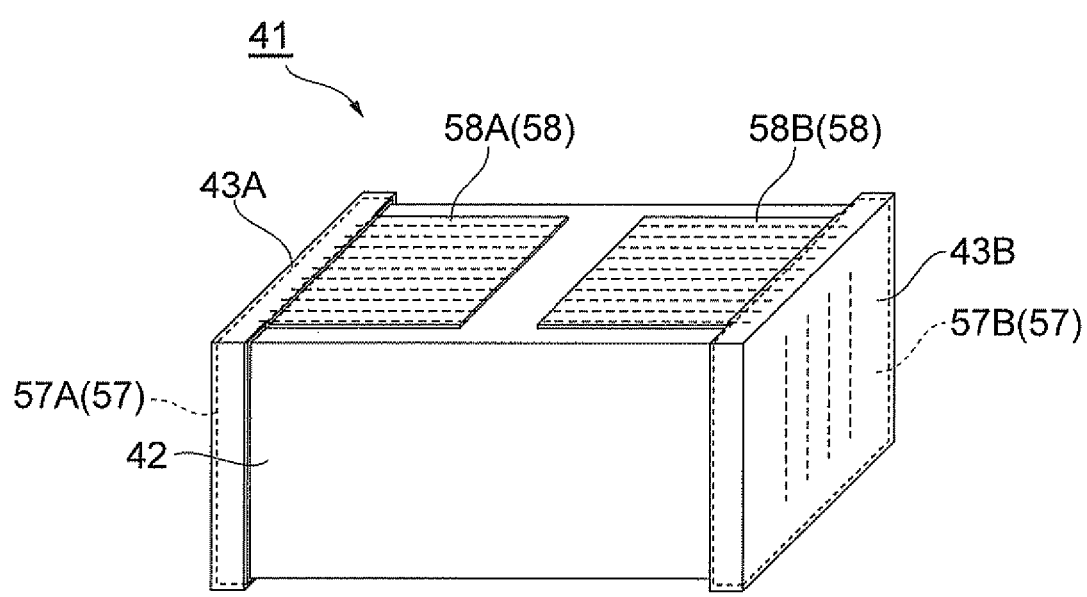
FIG. 9 is a perspective view illustrating the multilayer capacitor in accordance with a third embodiment of the present invention.
Figure 10:
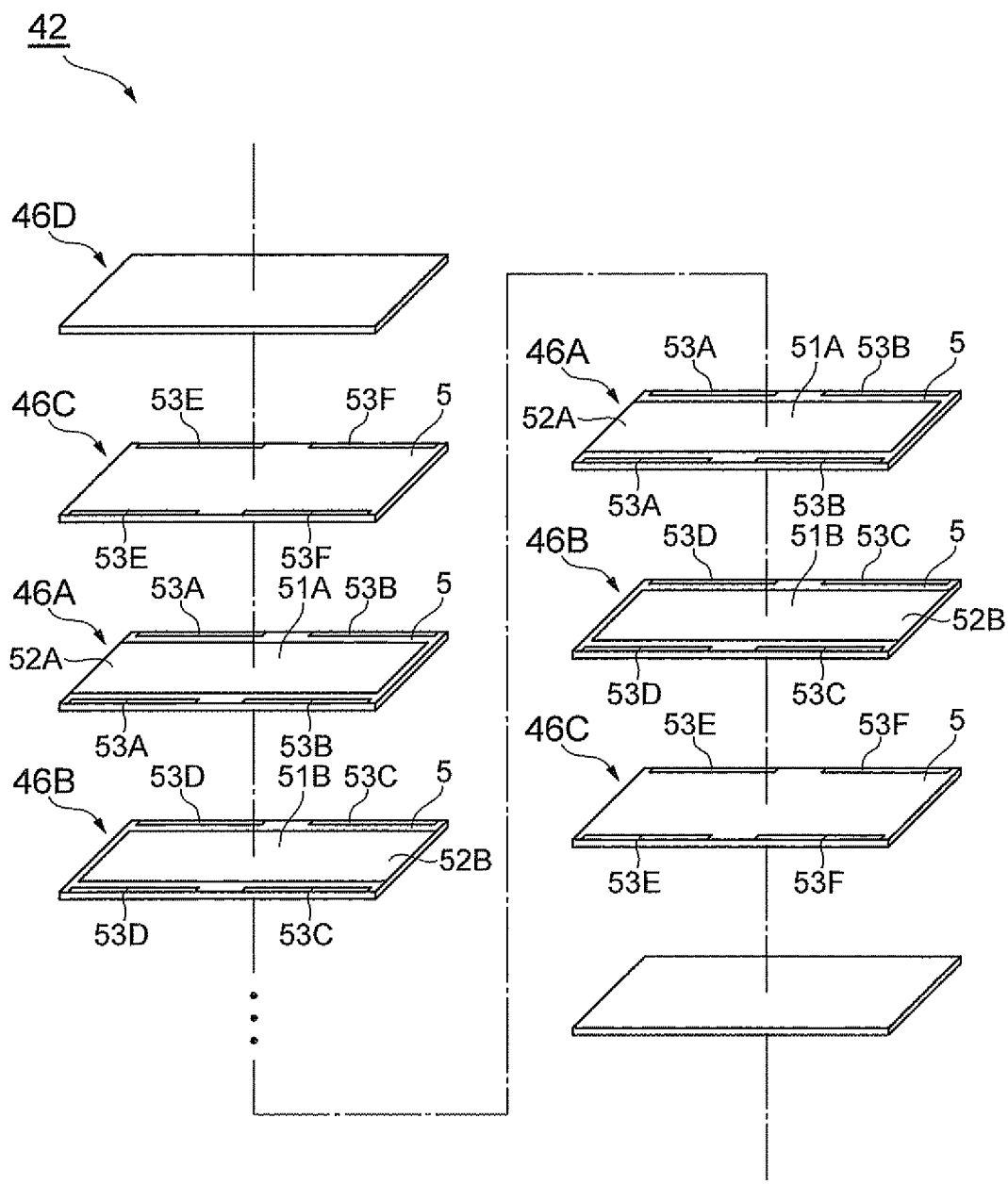
FIG. 10 is a diagram illustrating a layer structure of the multilayer capacitor shown in FIG. 9.

FIG. 9 is a perspective view illustrating the multilayer capacitor in accordance with the third embodiment of the present invention. FIG. 10 is a diagram illustrating a layer structure of the multilayer capacitor shown in FIG. 9. As illustrated in these drawings, this multilayer capacitor 41 differs from the second embodiment in electrode patterns of dummy electrodes 53A to 53F and their resulting structures of terminal electrodes 43A, 43B.

Figure 11:
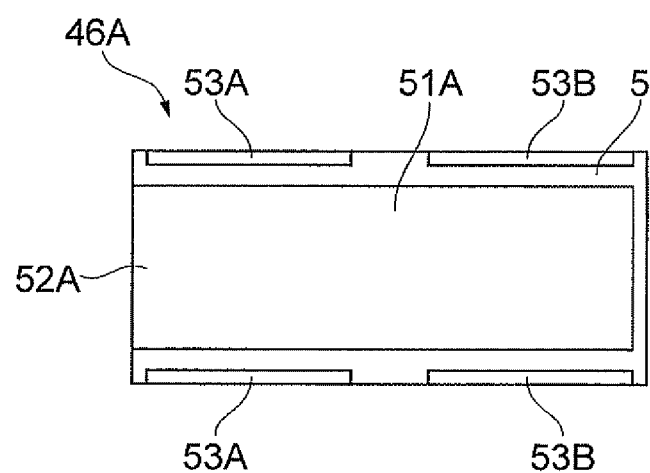
FIG. 11 is a set of diagrams illustrating inner electrode patterns of the multilayer capacitor shown in FIG. 9.
Figure 11:
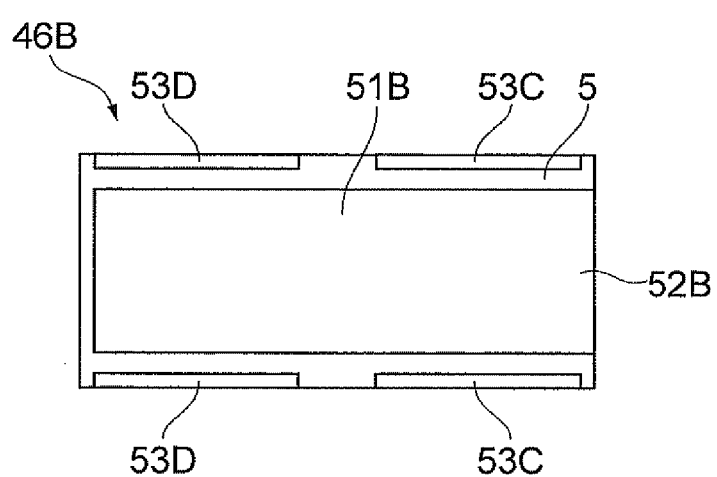
Figure 11:
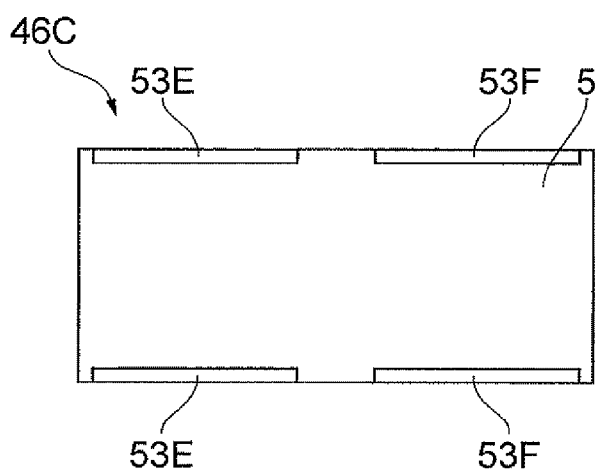

In this embodiment, as illustrated in FIG. 11, the dummy electrodes 53A, 53B on the same layer with an inner electrode 46A, the dummy electrodes 53C, 53D on the same layer with an inner electrode 46B, and the dummy electrodes 53E, 53F of a protective layer 46C do not extend to any of the longitudinal end faces of a multilayer body 42, but are exposed at only regions of the multilayer body 42 excluding its corners. A protective layer 46D formed with no dummy electrodes is further laid as a surface layer on the protective layer 46C.

For such an electrode pattern, a burned layer 57A constituting the first terminal electrode 43A is formed into a U-shaped cross section extending over one longitudinal end face of the multilayer body 42 and edges of end faces adjacent thereto so as to connect lead conductors 52A to the edges of the dummy electrodes 53A, 53A located on both sides of the lead conductors 52A and cover edges of the dummy electrodes 53D, 53E. A plating layer 58A is formed into a U-shaped cross section extending over one longitudinal end face of the multilayer body 42 and end faces adjacent thereto so as to cover the dummy electrodes 53A, 53D, 53E not covered with the burned layer 57A and the burned layer 57A.

A burned layer 57B constituting the second terminal electrode 43B is formed into a U-shaped cross section extending over the other longitudinal end face of the multilayer body 42 and edges of end faces adjacent thereto so as to connect lead conductors 52B to the edges of the dummy electrodes 53C, 53C located on both sides of the lead conductors 52B and cover edges of the dummy electrodes 53B, 53F. A plating layer 58B is formed into a U-shaped cross section extending over the other longitudinal end face of the multilayer body 42 and end faces adjacent thereto so as to cover the dummy electrodes 53B, 53C, 53F not covered with the burned layer 57B and the burned layer 57B.

Figure 12:
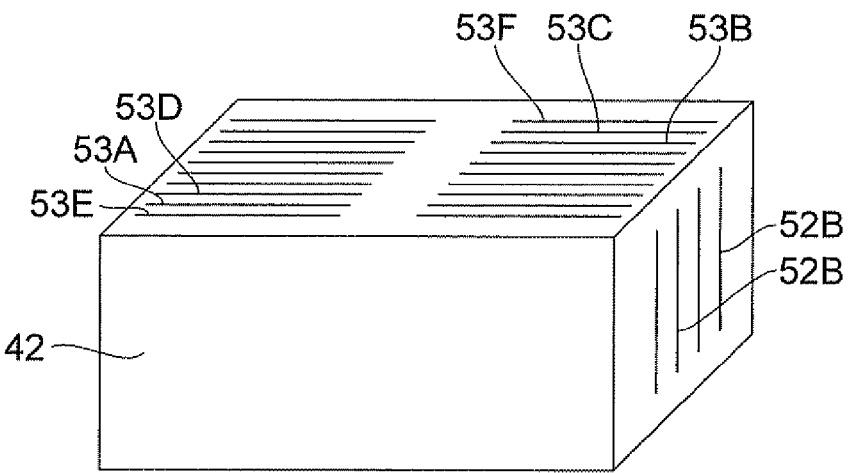
FIG. 12 is a set of diagrams illustrating a process of manufacturing terminal electrodes of the multilayer capacitor shown in FIG. 9.
Figure 12:
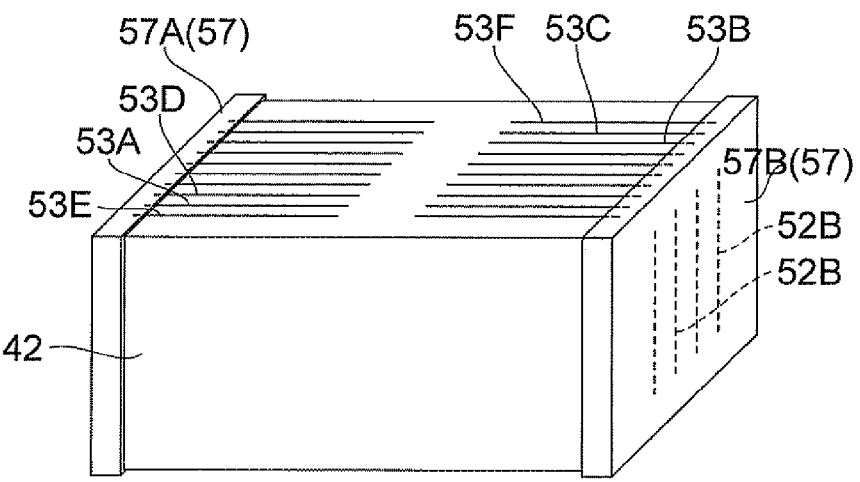
Figure 12:
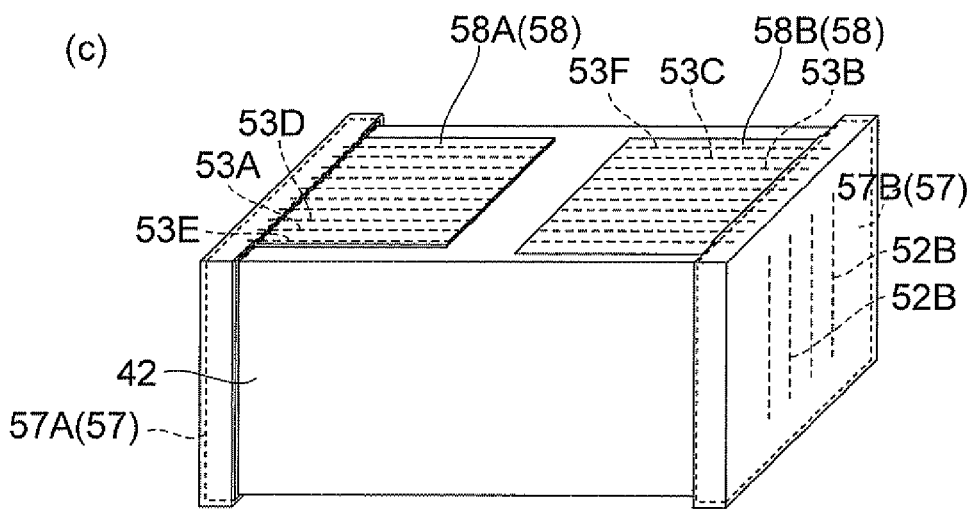

FIG. 12 is a set of diagrams illustrating a process of manufacturing the terminal electrodes 43A, 43B. First, green sheets formed with the above-mentioned electrode patterns by screen printing or the like are stacked and subjected to steps of pressing, cutting, firing, and the like, so as to yield the multilayer body 42 as illustrated in FIG. 12(a).

Subsequently, as illustrated in FIG. 12(b), a conductive paste is applied to one longitudinal end face of the multilayer capacitor 42 and edges of end faces adjacent thereto by dipping, for example, so as to cover the lead conductors 52A, the edges of the dummy electrodes 53A, 53A located on both sides of the lead conductors 52A, and a part of the dummy electrodes 53D, 53E. The conductive paste is also applied to the other longitudinal end face of the multilayer capacitor 42 and edges of end faces adjacent thereto so as to cover the lead conductors 52B, the edges of the dummy electrodes 53C, 53C located on both sides of the lead conductors 52B, and a part of the dummy electrodes 53B, 53F. Then, the conductive paste is burned at a predetermined temperature, so as to form the burned layers 57A, 57B.

Finally, as illustrated in FIG. 12(c), the plating layer 58A is formed over one longitudinal end face of the multilayer body 42 and end faces adjacent thereto so as to cover the rest of the dummy electrodes 53A, 53D, 53E not covered with the burned layer 57A and the burned layer 57A. Also, the plating layer 58B is formed over the other longitudinal end face of the multilayer body 42 and end faces adjacent thereto so as to cover the rest of the dummy electrodes 53B, 53C, 53F not covered with the burned layer 57B and the burned layer 57B. This forms the terminal electrodes 43A, 43B, thereby yielding the multilayer capacitor 41. For example, electroplating can be used for forming the plating layers 58A, 58B.

Thus constructed multilayer capacitor 41 can also achieve operations and effects similar to those of the first embodiment. Since the dummy electrodes 53A to 53F are exposed at regions of the multilayer body 42 excluding its corners, this embodiment can also prevent the dielectric layers 5 from peeling off from each other from the dummy electrodes acting as start points.

Fourth Embodiment

Figure 13:
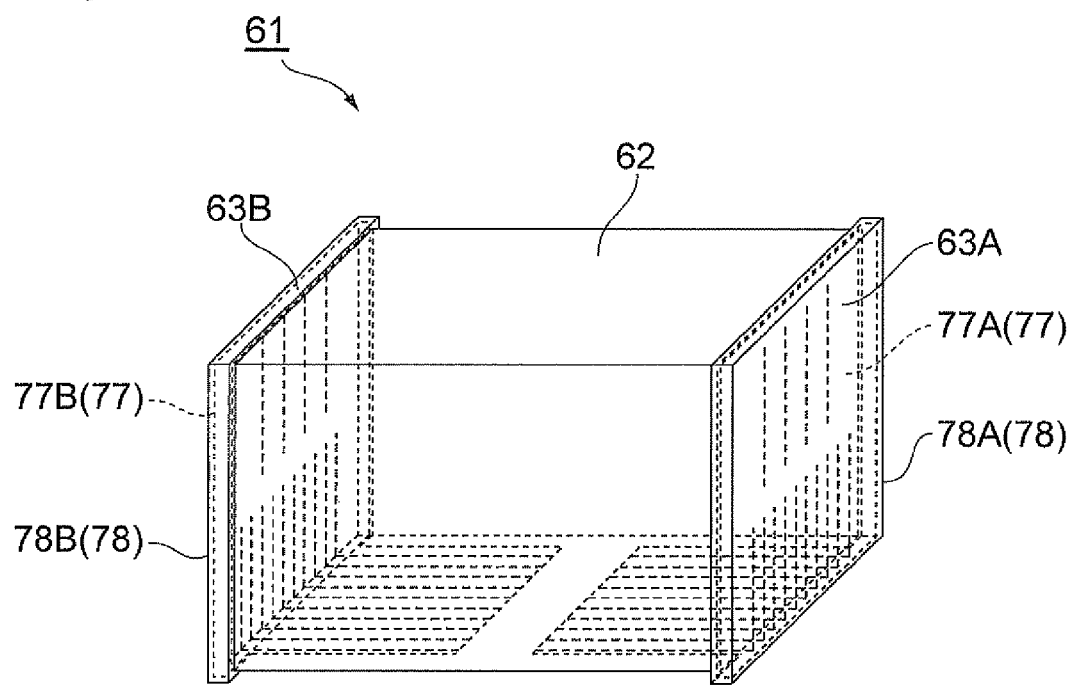
FIG. 13 is a perspective view illustrating the multilayer capacitor in accordance with a fourth embodiment of the present invention.
Figure 14:
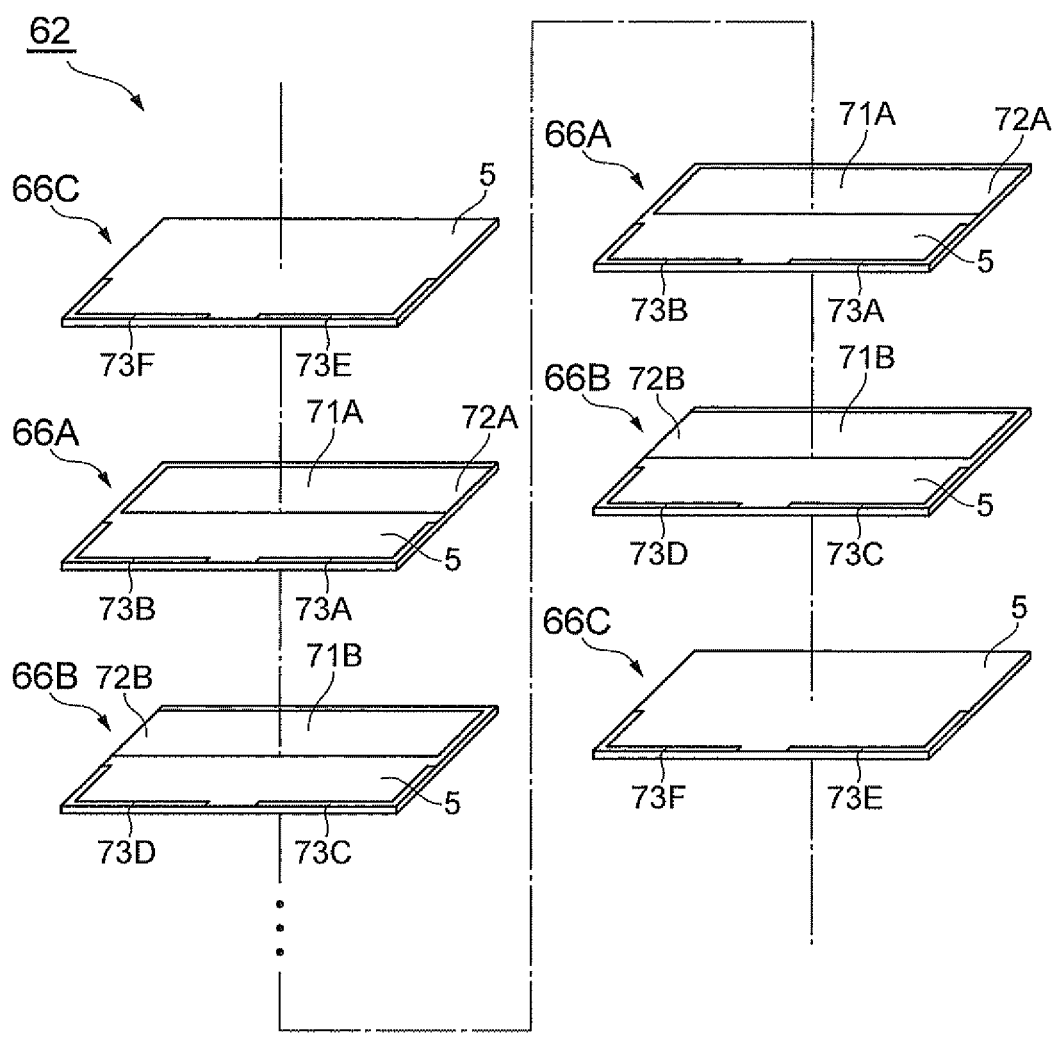
FIG. 14 is a diagram illustrating a layer structure of the multilayer capacitor shown in FIG. 13.

FIG. 13 is a perspective view illustrating the multilayer capacitor in accordance with the fourth embodiment of the present invention. FIG. 14 is a diagram illustrating a layer structure of the multilayer capacitor shown in FIG. 13. As illustrated in these drawings, this multilayer capacitor 61 differs from the first embodiment in electrode patterns of inner electrodes 66A, 66B and their resulting structures of terminal electrodes 63A, 63B.

Figure 15:
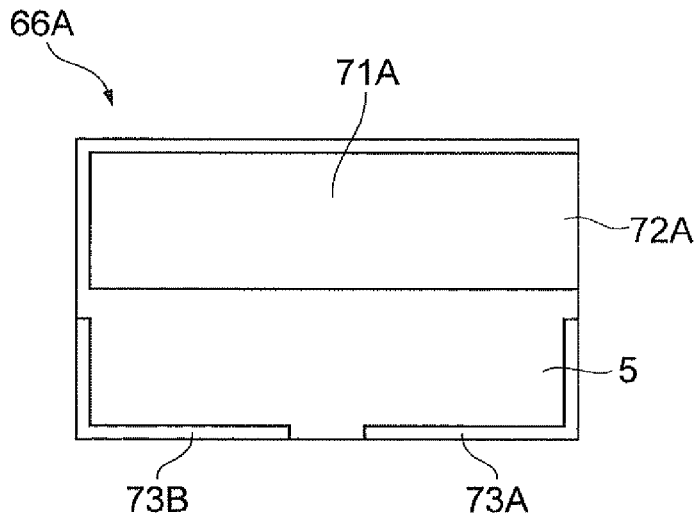
FIG. 15 is a set of diagrams illustrating inner electrode patterns of the multilayer capacitor shown in FIG. 13.
Figure 15:
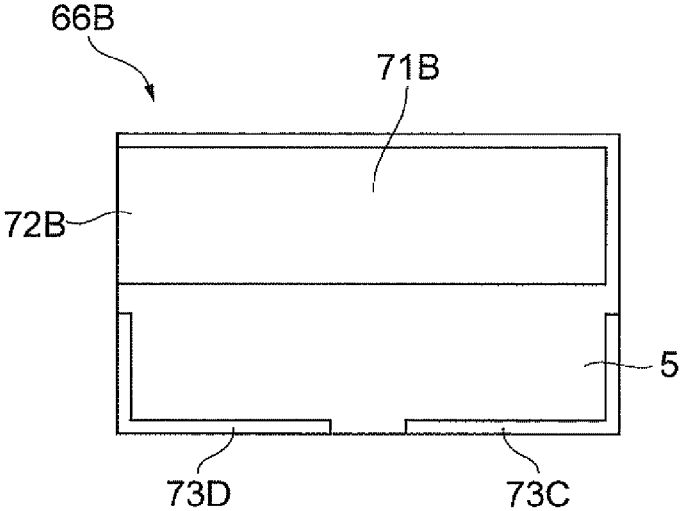
Figure 15:
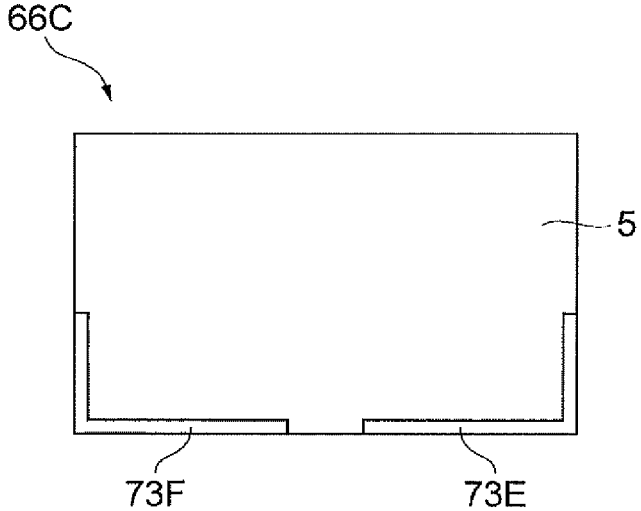

As illustrated in FIG. 15(a), the inner electrode 66A has a rectangular main electrode part 71A formed at a center portion and a lead conductor 72A drawn from the main electrode part 71A longitudinally of a multilayer body 62. The main electrode part 71A is arranged closer to an end face in the height direction of the multilayer body 62 on the side opposite from a mount surface. An end part of the lead conductor 72A is exposed at one longitudinal end face of the multilayer body 62 and connected to the first terminal electrode 63A.

Dummy electrodes 73A, 73B are formed on the same layer with the inner electrode 66A. The dummy electrode 73A has an L-shaped cross section extending along an end part of the mount surface on one longitudinal end face of the multilayer body 62 and the mount surface adjacent thereto and is connected to the first terminal electrode 63A. The dummy electrode 73B has an L-shaped cross section extending along an end part of the mount surface on the other longitudinal end face of the multilayer body 62 and the mount surface adjacent thereto and is connected to the second terminal electrode 63B.

As illustrated in FIG. 15(b), the inner electrode 66B has a rectangular main electrode part 71B formed at a center portion and a lead conductor 72B drawn from the main electrode part 71B longitudinally of the multilayer body 62. As with the main electrode part 71A, the main electrode part 71B is arranged closer to the end face in the height direction of the multilayer body 62 on the side opposite from the mount surface. An end part of the lead conductor 72B is exposed at one longitudinal end face of the multilayer body 62 and connected to the second terminal electrode 63B.

Dummy electrodes 73C, 73D are formed on the same layer with the inner electrode 66B. The dummy electrode 73C has an L-shaped cross section extending along an end part of the mount surface on one longitudinal end face of the multilayer body 62 and the mount surface adjacent thereto and is connected to the first terminal electrode 63A. The dummy electrode 73D has an L-shaped cross section extending along an end part of the mount surface on the other longitudinal end face of the multilayer body 62 and the mount surface adjacent thereto and is connected to the second terminal electrode 63B.

A protective layer 66C can be laid as appropriate on a surface layer part in the stacking direction of the multilayer body 62. As illustrated in FIG. 15(c), the protective layer 66C is formed with dummy electrodes 73E, 73F. The dummy electrode 73E has an L-shaped cross section extending along an end part of the mount surface on one longitudinal end face of the multilayer body 62 and the mount surface adjacent thereto and is connected to the first terminal electrode 63A. The dummy electrode 73F has an L-shaped cross section extending along an end part of the mount surface on the other longitudinal end face of the multilayer body 62 and the mount surface adjacent thereto and is connected to the second terminal electrode 63B.

The first terminal electrode 63A has an L-shaped cross section extending over one longitudinal end face of the multilayer body 62 and the mount surface adjacent thereto. The second terminal electrode 63B has an L-shaped cross section extending over the other longitudinal end face of the multilayer body 62 and the mount surface adjacent thereto.

A burned layer 77A constituting the first terminal electrode 63A is formed on one longitudinal end face of the multilayer body 62 and edges of end faces adjacent thereto so as to cover the lead conductors 72A and edges of the dummy electrodes 73A, 73C, 73E. A plating layer 78A is formed into an L-shaped cross section extending over one longitudinal end face of the multilayer body 62 and an end face adjacent thereto so as to cover the rest of the dummy electrodes 73A, 73C, 73E not covered with the burned layer 77A and the burned layer 77A.

A burned layer 77B constituting the second terminal electrode 63B is formed on the other longitudinal end face of the multilayer body 62 and edges of end faces adjacent thereto so as to cover the lead conductors 72B and edges of the dummy electrodes 73B, 73D, 73F. A plating layer 78B is formed into an L-shaped cross section extending over the other longitudinal end face of the multilayer body 62 and an end face adjacent thereto so as to cover the rest of the dummy electrodes 73B, 73D, 73F not covered with the burned layer 77B and the burned layer 77B.

Figure 16:
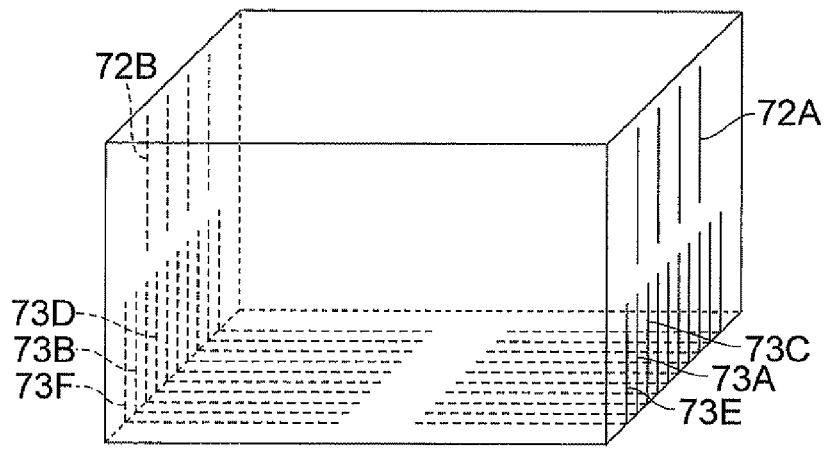
FIG. 16 is a set of diagrams illustrating a process of manufacturing terminal electrodes of the multilayer capacitor shown in FIG. 13.
Figure 16:
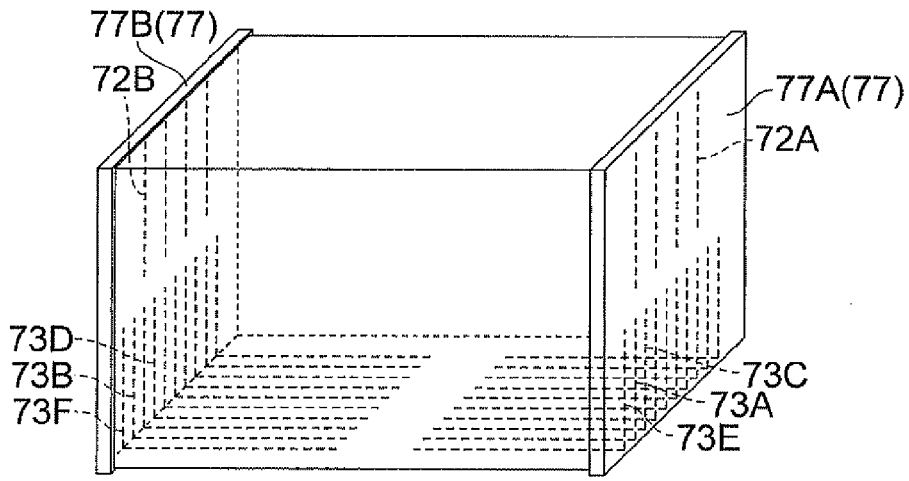
Figure 16:
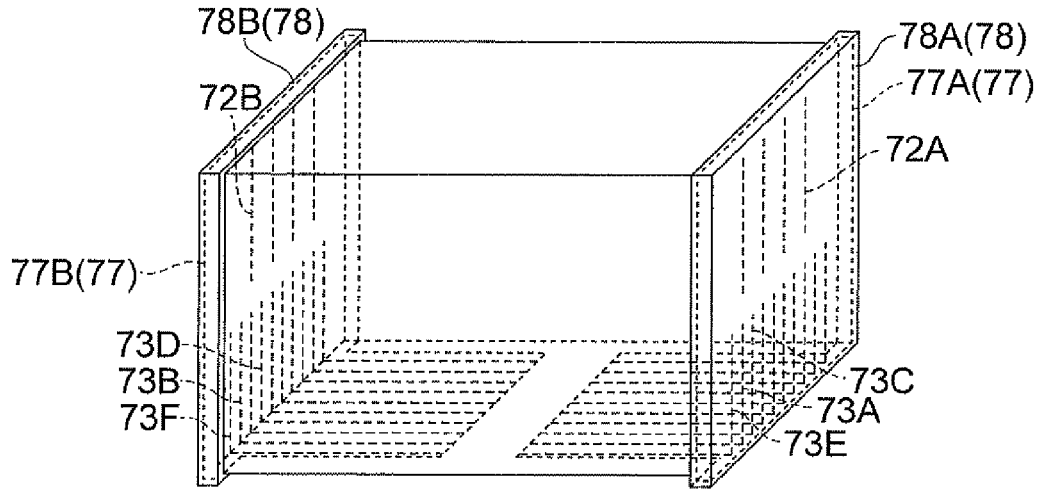

FIG. 16 is a set of diagrams illustrating a process of manufacturing the terminal electrodes 63A, 63B. First, green sheets formed with the above-mentioned electrode patterns by screen printing or the like are stacked and subjected to steps of pressing, cutting, firing, and the like, so as to yield the multilayer body 62 as illustrated in FIG. 16(a).

Subsequently, as illustrated in FIG. 16(b), a conductive paste is applied to one longitudinal end face of the multilayer capacitor 62 and edges of end faces adjacent thereto by dipping, for example, so as to cover the lead conductors 72A and edges of the dummy electrodes 73A, 73C, 73E. The conductive paste is also applied to the other longitudinal end face of the multilayer capacitor 62 and edges of end faces adjacent thereto so as to cover the lead conductors 72B and edges of the dummy electrodes 73B, 73D, 73F. Then, the conductive paste is burned at a predetermined temperature, so as to form the burned layers 77A, 77B.

Finally, as illustrated in FIG. 16(c), the plating layer 78A is formed over one longitudinal end face of the multilayer body 62 and an end face adjacent thereto so as to cover the rest of the dummy electrodes 73A, 73C, 73E not covered with the burned layer 77A and the burned layer 77A. Also, the plating layer 78B is formed over the other longitudinal end face of the multilayer body 62 and an end face adjacent thereto so as to cover the rest of the dummy electrodes 73B, 73D, 73F not covered with the burned layer 77B and the burned layer 77B. This forms the terminal electrodes 63A, 63B, thereby yielding the multilayer capacitor 61. For example, electroplating can be used for forming the plating layers 78A, 78B.

In thus constructed multilayer capacitor 61, the burned layers 77A, 77B are also formed so as to cover all of the lead conductors 72A, 72B drawn from the inner electrodes 66A, 66B to end faces of the multilayer body 62. This can keep the plating solution from infiltrating onto the inner electrodes 66A, 66B when forming the plating layers 78A, 78B and prevent insulation failures from occurring. Since the burned layers 77A, 77B cover a part of the dummy electrodes 73A to 73F, the area of the burned layers 77A, 77B can be made smaller than in the case where all of the dummy electrodes 73A to 73F are covered. This can inhibit excessive stresses from occurring in the burned layers 77A, 77B and thus can prevent cracks from being generated by stresses in the burned layers 77A, 77B.

Since the burned layers 77A, 77B cover a part of the dummy electrodes 73A to 73F, when covering the rest of the dummy electrodes 73A to 73F with the plating layers 78A, 78B, a current is easier to flow into the plating layers 78A, 78B through conductive particles contained in the burned layers 77A, 77B. Hence, the plating layers 78A, 78B can reliably be formed on the dummy electrodes 73A to 73F, while the plating layers 78A, 78B on the surface of the multilayer body 62 can be formed by a uniform thickness with the plating layers 78A, 78B on the burned layers 77A, 77B.

In the multilayer capacitor 61, the inner electrodes 66A, 66B are arranged substantially orthogonal to the mount surface. This can achieve lower ESL even when the number of the inner electrodes 66A, 66B increases.

In the multilayer capacitor 61, one side of the multilayer body 62 is a mount surface to a substrate, while the inner electrodes 66A, 66B are lopsided to the side opposite from the mount surface in the multilayer body 62. This can fully secure a distance between the mount surface and the inner electrodes 66A, 66B, whereby cracks can be inhibited from reaching the inner electrodes 66A, 66B even if a microcrack is generated by an electrostrictive stress. This can restrain capacitance from fluctuating.

In the multilayer capacitor 61, the dummy electrodes 73A to 73F are disposed on the same layers with their corresponding inner electrodes 66A, 66B. This allows the terminal electrodes 63A, 63B to secure a greater width. Even when the dummy electrodes 73A to 73F are provided over a plurality of layers, forming the burned layers 77A, 77B earlier can keep the plating solution from infiltrating onto the inner electrodes 66A, 66B and prevent insulation failures from occurring.

Fifth Embodiment

Figure 17:
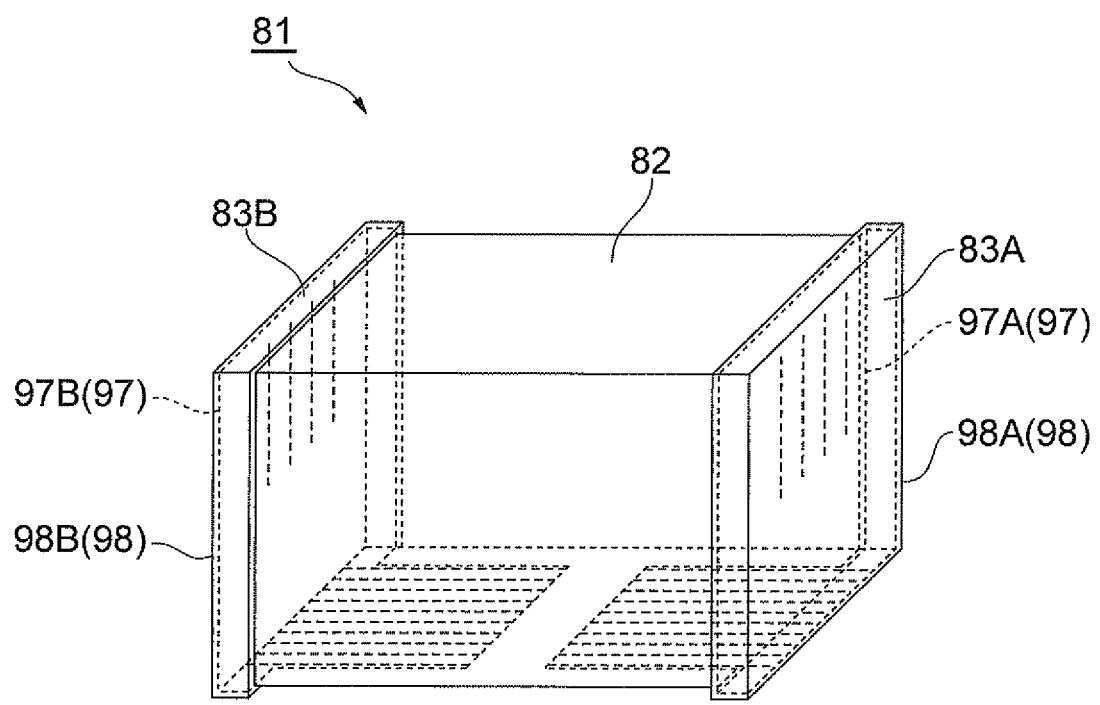
FIG. 17 is a perspective view illustrating the multilayer capacitor in accordance with a fifth embodiment of the present invention.
Figure 18:
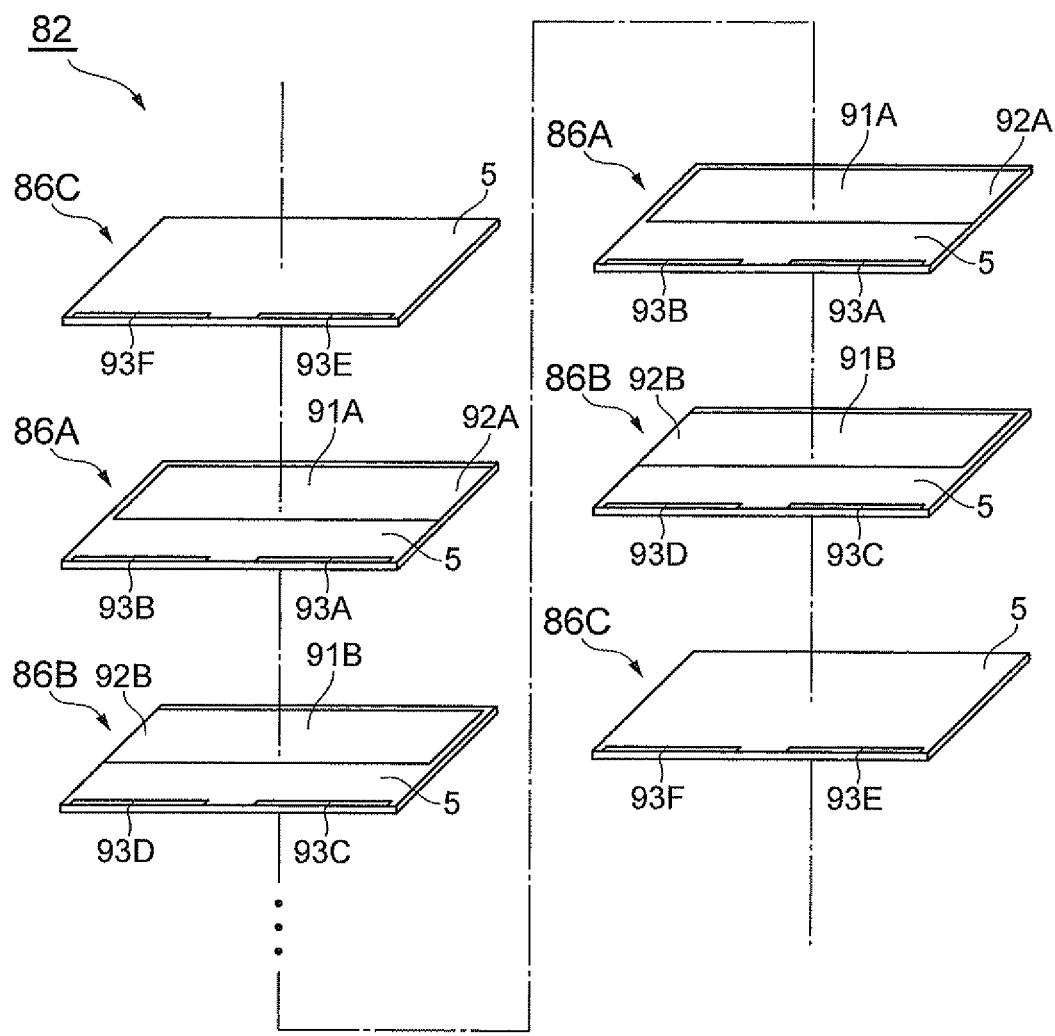
FIG. 18 is a diagram illustrating a layer structure of the multilayer capacitor shown in FIG. 17.

FIG. 17 is a perspective view illustrating the multilayer capacitor in accordance with the fifth embodiment of the present invention. FIG. 18 is a diagram illustrating a layer structure of the multilayer capacitor shown in FIG. 17. As illustrated in these drawings, this multilayer capacitor 81 differs from the fourth embodiment in electrode patterns of dummy electrodes 93A to 93F.

Figure 19:
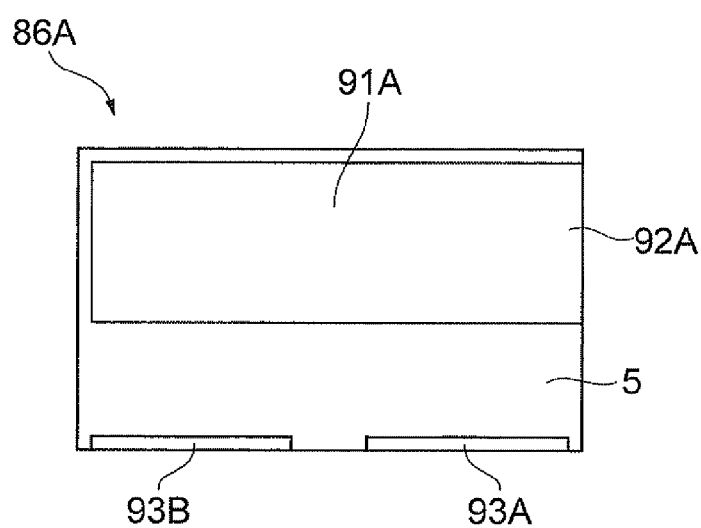
FIG. 19 is a set of diagrams illustrating inner electrode patterns of the multilayer capacitor shown in FIG. 17.
Figure 19:
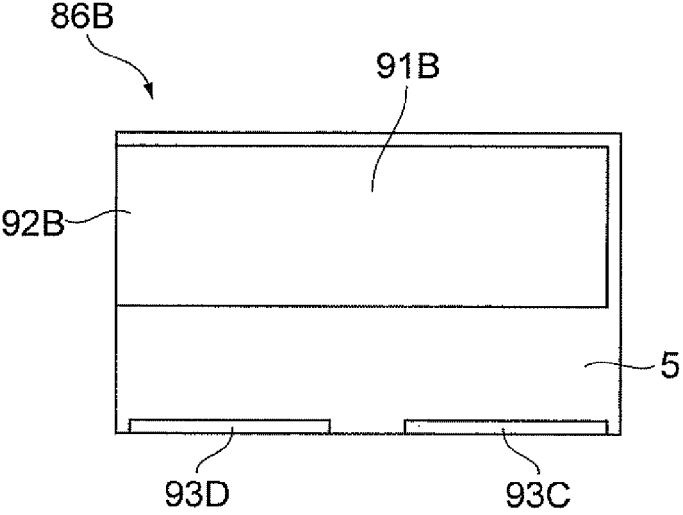
Figure 19:
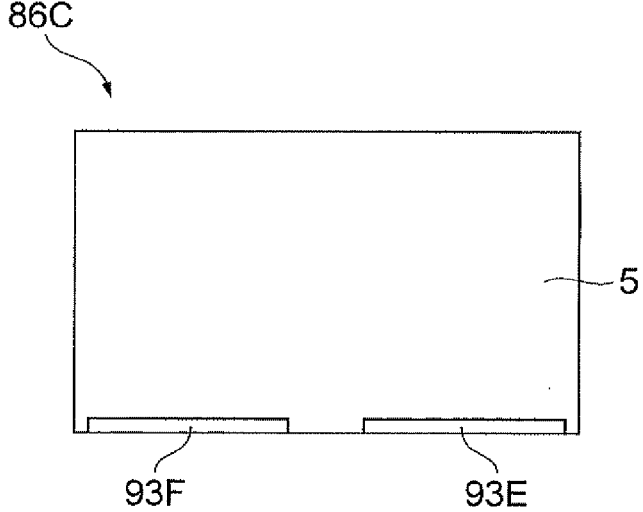

In the multilayer capacitor 81, as illustrated in FIG. 19, the dummy electrodes 93A, 93B on the same layer with an inner electrode 86A, the dummy electrodes 93C, 93D on the same layer with an inner electrode 86B, and the dummy electrodes 93E, 93F of a protective layer 86C do not extend to any of the longitudinal end faces of a multilayer body 82, but are exposed at a mount surface of the multilayer body 82 excluding its corners.

For such an electrode pattern, a burned layer 97A constituting the first terminal electrode 83A is formed on one longitudinal end face of the multilayer capacitor 82 and edges of end faces adjacent thereto so as to cover lead conductors 92A and edges of the dummy electrodes 93A, 93C, 93E. A plating layer 98A is formed into an L-shaped cross section extending over one longitudinal end face of the multilayer body 82 and an end face adjacent thereto so as to cover the rest of the dummy electrodes 93A, 93C, 93E not covered with the burned layer 97A and the burned layer 97A.

A burned layer 97B constituting the second terminal electrode 83B is formed on the other longitudinal end face of the multilayer capacitor 82 and edges of end faces adjacent thereto so as to cover lead conductors 92B and edges of the dummy electrodes 93B, 93D, 93F. A plating layer 98B is formed into an L-shaped cross section extending over the other longitudinal end face of the multilayer body 82 and an end face adjacent thereto so as to cover the rest of the dummy electrodes 93B, 93D, 93F not covered with the burned layer 97B and the burned layer 97B.

Figure 20:
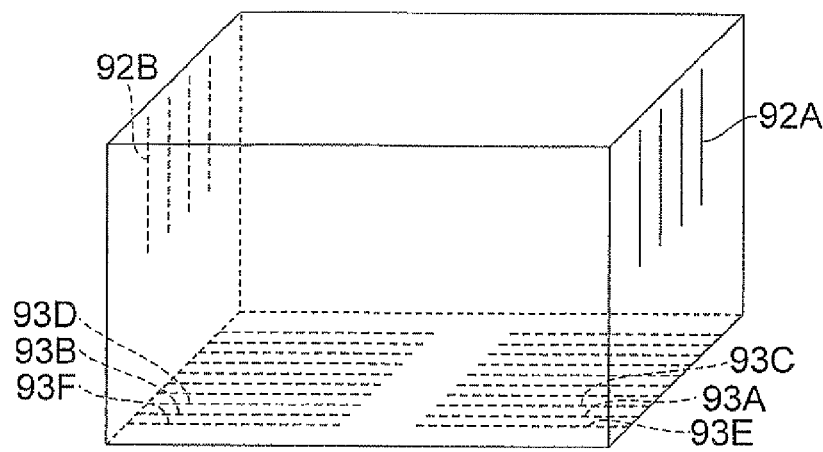
FIG. 20 is a set of diagrams illustrating a process of manufacturing terminal electrodes of the multilayer capacitor shown in FIG. 17.
Figure 20:
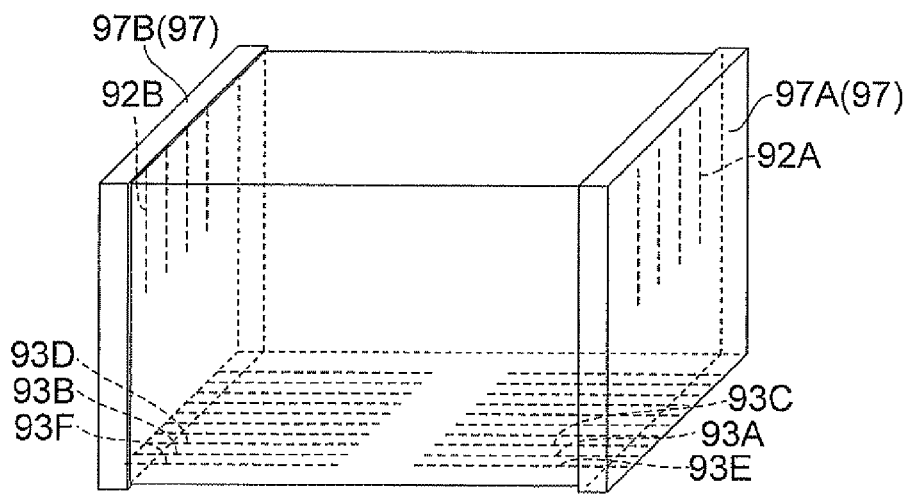
Figure 20:
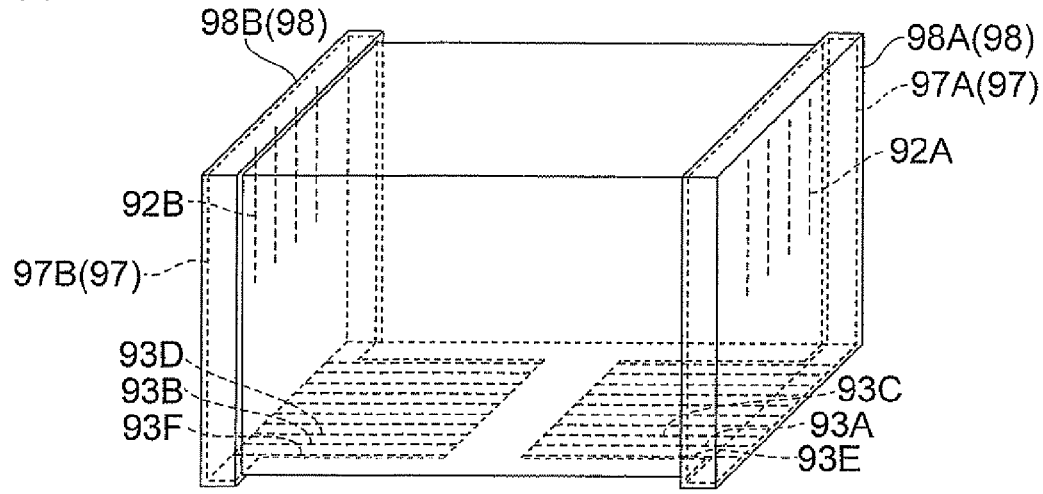

FIG. 20 is a set of diagrams illustrating a process of manufacturing the terminal electrodes 83A, 83B. First, green sheets formed with the above-mentioned electrode patterns by screen printing or the like are stacked and subjected to steps of pressing, cutting, firing, and the like, so as to yield the multilayer body 82 as illustrated in FIG. 20(a).

Subsequently, as illustrated in FIG. 20(b), a conductive paste is applied to one longitudinal end face of the multilayer capacitor 82 and edges of end faces adjacent thereto by dipping, for example, so as to cover the lead conductors 92A and edges of the dummy electrodes 93A, 93C, 93E. The conductive paste is also applied to the other longitudinal end face of the multilayer capacitor 92 and edges of end faces adjacent thereto so as to cover the lead conductors 92B and edges of the dummy electrodes 93B, 93D, 93F. Then, the conductive paste is burned at a predetermined temperature, so as to form the burned layers 97A, 97B.

Finally, as illustrated in FIG. 20(c), the plating layer 98A is formed over one longitudinal end face of the multilayer body 82 and an end face adjacent thereto so as to cover the rest of the dummy electrodes 93A, 93C, 93E not covered with the burned layer 97A and the burned layer 97A. Also, the plating layer 98B is formed over the other longitudinal end face of the multilayer body 82 and an end face adjacent thereto so as to cover the rest of the dummy electrodes 93B, 93D, 93F not covered with the burned layer 97B and the burned layer 97B. This forms the terminal electrodes 83A, 83B, thereby yielding the multilayer capacitor 81. For example, electroplating can be used for forming the plating layers 98A, 98B.

Thus constructed multilayer capacitor 81 can also achieve operations and effects similar to those of the fourth embodiment. Since the dummy electrodes 93A to 93F are exposed at regions of the multilayer body 82 excluding its corners, this embodiment can also prevent the dielectric layers 5 from peeling off from each other from the dummy electrodes acting as start points.

What is claimed is:

1. A multilayer capacitor comprising:
    a multilayer body constructed by stacking a plurality of dielectric layers formed with an inner electrode;
    a terminal electrode formed on a surface of the multilayer body;
    a lead conductor drawn from the inner electrode to the surface of the multilayer body and connected to the terminal electrode; and
    a dummy electrode separated from the inner electrode and connected to the terminal electrode;
    wherein the terminal electrode has a burned layer and a plating layer each formed on the surface of the multilayer body;
    wherein the burned layer covers the whole of the lead conductor and a part of the dummy electrode, in a direction along a periphery of the dielectric layer, and does not cover the rest of the dummy electrode;
    wherein the plating layer covers the rest of the dummy electrode and the burned layer; and
    wherein the dummy electrode is disposed on the same dielectric layer with the inner electrode corresponding thereto.

2. A multilayer capacitor according to claim 1, wherein one side of the multilayer body is a mount surface to a substrate; and
    wherein the inner electrode in the multilayer body is lopsided to the side opposite from the mount surface in the multilayer body.

3. A multilayer capacitor according to claim 2, wherein the inner electrode is arranged substantially orthogonal to the mount surface.

4. A multilayer capacitor according to claim 1, wherein dummy electrodes are disposed on both sides of the lead conductor interposed therebetween; and
    wherein the burned layer is disposed so as to connect the dummy electrodes to each other.

5. A multilayer capacitor according to claim 2, wherein dummy electrodes are disposed on both sides of the lead conductor interposed therebetween; and
    wherein the burned layer is disposed so as to connect the dummy electrodes to each other.

6. A multilayer capacitor according to claim 3, wherein dummy electrodes are disposed on both sides of the lead conductor interposed therebetween; and
    wherein the burned layer is disposed so as to connect the dummy electrodes to each other.

7. A multilayer capacitor according to claim 4, wherein the dummy electrodes are disposed on the same layer with the inner electrode corresponding thereto.

8. A multilayer capacitor according to claim 5, wherein the dummy electrodes are disposed on the same layer with the inner electrode corresponding thereto.

9. A multilayer capacitor according to claim 6, wherein the dummy electrodes are disposed on the same layer with the inner electrode corresponding thereto.

10. A multilayer capacitor according to claim 1, wherein the dummy electrode is exposed at a region of the multilayer body excluding a corner thereof.

11. A multilayer capacitor according to claim 2, wherein the dummy electrode is exposed at a region of the multilayer body excluding a corner thereof.

12. A multilayer capacitor according to claim 3, wherein the dummy electrode is exposed at a region of the multilayer body excluding a corner thereof.

13. A multilayer capacitor according to claim 4, wherein the dummy electrodes are exposed at a region of the multilayer body excluding a corner thereof.

14. A multilayer capacitor according to claim 5, wherein the dummy electrodes are exposed at a region of the multilayer body excluding a corner thereof.

15. A multilayer capacitor according to claim 6, wherein the dummy electrodes are exposed at a region of the multilayer body excluding a corner thereof.

16. A multilayer capacitor according to claim 1, wherein the dummy electrode is exposed at a region of the multilayer body excluding a corner thereof.

17. A multilayer capacitor according to claim 7, wherein the dummy electrodes are exposed at a region of the multilayer body excluding a corner thereof.

18. A multilayer capacitor according to claim 8, wherein the dummy electrodes are exposed at a region of the multilayer body excluding a corner thereof.

19. A multilayer capacitor according to claim 9, wherein the dummy electrodes are exposed at a region of the multilayer body excluding a corner thereof.

20. A method of manufacturing a multilayer capacitor comprising:
- a multilayer body constructed by stacking a plurality of dielectric layers formed with an inner electrode;
- a terminal electrode formed on a surface of the multilayer body;
- a lead conductor drawn from the inner electrode to the surface of the multilayer body and connected to the terminal electrode; and
- a dummy electrode separated from the inner electrode and connected to the terminal electrode, the dummy electrode being disposed on the same dielectric layer with the inner electrode corresponding thereto;

the method comprising the steps of:
forming a burned layer by burning a conductive paste applied so as to cover the whole of the lead conductor and a part of the dummy electrode, in a direction along a periphery of the dielectric layer, and not covering the rest of the dummy electrode; and
forming a plating layer on the surface of the multilayer body so as to cover the rest of the dummy electrode and the burned layer.

* * * * *